US008705244B2

(12) United States Patent
Takeda

(10) Patent No.: US 8,705,244 B2
(45) Date of Patent: Apr. 22, 2014

(54) PROJECTOR AND UNIT FOR PROJECTOR

(75) Inventor: Mikiya Takeda, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 518 days.

(21) Appl. No.: 12/998,616

(22) PCT Filed: Dec. 12, 2008

(86) PCT No.: PCT/JP2008/072632
§ 371 (c)(1),
(2), (4) Date: May 9, 2011

(87) PCT Pub. No.: WO2010/067451
PCT Pub. Date: Jun. 17, 2010

(65) Prior Publication Data
US 2011/0211315 A1 Sep. 1, 2011

(51) Int. Cl.
H05K 7/20 (2006.01)
(52) U.S. Cl.
USPC ...... 361/756; 361/679.21; 361/728; 361/752; 361/760; 353/119
(58) Field of Classification Search
USPC ............. 361/679.21, 679.31, 679.32, 679.57, 361/679.58, 715, 724–728, 747–748, 752, 361/760–761
See application file for complete search history.

(56) References Cited

U.S. PATENT DOCUMENTS

| 8,416,575 | B2 * | 4/2013 | Sato et al. | 361/720 |
| 8,451,622 | B2 * | 5/2013 | Yu | 361/800 |
| 2004/0046940 | A1 * | 3/2004 | Yanagisawa | 353/31 |
| 2005/0094106 | A1 * | 5/2005 | Nakamura | 353/57 |
| 2006/0077353 | A1 * | 4/2006 | Wu | 353/52 |
| 2007/0109752 | A1 * | 5/2007 | Xiao et al. | 361/724 |
| 2010/0283904 | A1 * | 11/2010 | Takata et al. | 348/725 |
| 2012/0208387 | A1 * | 8/2012 | Takeda | 439/310 |

FOREIGN PATENT DOCUMENTS

| JP | 7-106778 A | 4/1995 |
| JP | 11-3137 A | 1/1999 |
| JP | 2001-83602 A | 3/2001 |
| JP | 2003-101263 A | 4/2003 |
| JP | 2003-316472 A | 11/2003 |
| JP | 2004-264759 A | 9/2004 |
| JP | 2006-119285 A | 5/2006 |
| JP | 2006-339361 A | 12/2006 |
| JP | 2007-52320 A | 3/2007 |
| JP | 2008-51848 A | 3/2008 |

* cited by examiner

Primary Examiner — Courtney Smith
(74) Attorney, Agent, or Firm — McGinn IP Law Group, PLLC

(57) ABSTRACT

A projector includes: a mounting unit for mounting optional unit (2) having an extension function section, connection substrate (7), and cable (6) for electrically connecting the extension function section and connection substrate (7); mother substrate (31) having connector (31a) to which terminal (7a) is electrically connected; Z-shaped guide metal fitting (40) located on the mounting unit and configured to movably guide terminal (7a) to connector (31a); and a case having mother substrate (31) located therein. One side face of the case has an opening for inserting/removing optional unit (2) into/from the case, and a side panel for covering the opening being removably located in the opening. When optional unit (2) is inserted into the case from the opening, connection substrate (7) is guided by Z-shaped guide metal filling (40), and optional unit (2) functions when terminal (7a) is electrically connected to connector (31a).

13 Claims, 33 Drawing Sheets

PROJECTOR AND UNIT FOR PROJECTOR

TECHNICAL FIELD

The present invention relates to a projector for projecting an image on a projection surface such as a screen, and a unit for a projector, which is mounted on the projector.

BACKGROUND ART

A projector configured to selectively mount, when needed, an optional board (extension board) that is a circuit board having various extension functions to extend functions provided beforehand in the projector is disclosed in, for example, JP2004-264759A. For such a projector, there is known a configuration that includes a mounting unit for selectively mounting an optional unit having various extension function sections.

As the optional unit of this type, for example, there are a wireless LAN (Local Area Network) unit, a RGB (red, green, and blue) signal distribution unit, and an adaptor unit including an extension slot to mount the extension board, each of which includes a plurality of cables electrically connected to substrates located in the projector.

As shown in FIGS. 1 and 2, when optional unit 102 is mounted on mounting unit 104 of the projector, cables of optional unit 102 electrically connected to various extension function sections are electrically connected to substrates 105 and 106 located in the projector.

DISCLOSURE OF INVENTION

Thus, for example, when an optional unit having two video signal cables, one power cable, one LAN cable, and one control cable is mounted on the projector, these various cables must be inserted into connectors of a plurality of substrates or the like, and connection work must be carried out to electrically connect the cables. As a result, when the optional unit is mounted on the projector, work for connecting various cables included in the optional unit to the projector is complex.

When the optional unit is mounted on the projector, in the process of attaching the optional unit itself, a side panel is removed from a case of the projector, and the optional unit is inserted by sliding it along a guide member from one side face from which the side panel has been removed. The optional unit can accordingly be fitted in the projector. However, the work for inserting the various cables included in the optional unit into the connectors of the substrates to electrically connect the cables is a task that is difficult to implement when carried out only from one side face from which the side panel has been removed, and hence the work cannot be performed smoothly.

Thus, other panels such as a top panel and a front panel must also be removed from the case of the projector, complicating the panel removal work. In addition, even in the state of the top panel and the front panel have been removed, at those locations where cables have been inserted into the connectors, the surrounding space in the projector is relatively narrow, and therefore, it is difficult to carry out the task of inserting cables into the connectors.

It is an object of the present invention to provide a projector and a unit for a projector, in which task of inserting cables into the connectors can be made easier when the unit is mounted on the projector.

The projector according to the present invention includes: a mounting unit for mounting a unit having an extension function section, a connection substrate in which a terminal is located, and a cable for electrically connecting the extension function section and the connection substrate; a substrate having a connector to which the terminal of the connection substrate is electrically connected; a guide member located on the mounting unit and configured to movably guide the terminal of the connection substrate to the connector of the substrate; and a case in which the substrate is located. One side face of the case has an opening for inserting/removing the unit into/from the case, and a side face member for covering the opening being removably located in the opening. When the unit is inserted into the case from the opening, the connection substrate is guided by the guide member, and the unit functions when the terminal is electrically connected to the connector.

The unit for a projector according to the present invention is configured to be mounted on a mounting unit of the projector that includes: a substrate having a connector; a guide member for movably guiding the unit to the connector; and a case in which the substrate is located. One side face of the case has an opening for inserting/removing the unit into/from the case, and a side face member for covering the opening being removably located in the opening. The unit for the projector includes: an extension function section; a connection substrate in which a terminal is located to be electrically connected to the connector of the substrate; and a cable for electrically connecting the extension function section and the connection substrate. The unit for the projector is configured such that when the unit is inserted into the case from the opening, the connection substrate is guided by the guide member, and the unit functions when the terminal is electrically connected to the connector.

The unit according to the present invention indicates a unit for adding various extension functions, for example, a wireless LAN unit, a RGB signal distribution unit, or an adaptor unit having an extension slot on which a circuit board (extension board) having an extension function is mounted. The extension function section according to the present invention includes an electronic circuit for executing various extension functions, a control circuit for controlling the electronic circuit, and a connector to which the extension board is electrically connected.

According to the present invention, by removing only the side face member from the case and guiding the unit by the guide member to move toward the connector of the substrate, the electrical connection between the terminal of the unit and the connector of the substrate is completed, enabling the unit to function. Thus, according to the present invention, when the unit is mounted on the projector, complex work for connecting the cable of the unit to the substrate can be made unnecessary, and work for removing a plurality of outer case members constituting the case can be made unnecessary. As a result, connection work of the unit can be simplified, improving the ease with which the work can be carried out.

BEST MODES FOR CARRYING OUT INVENTION

Figure 1:
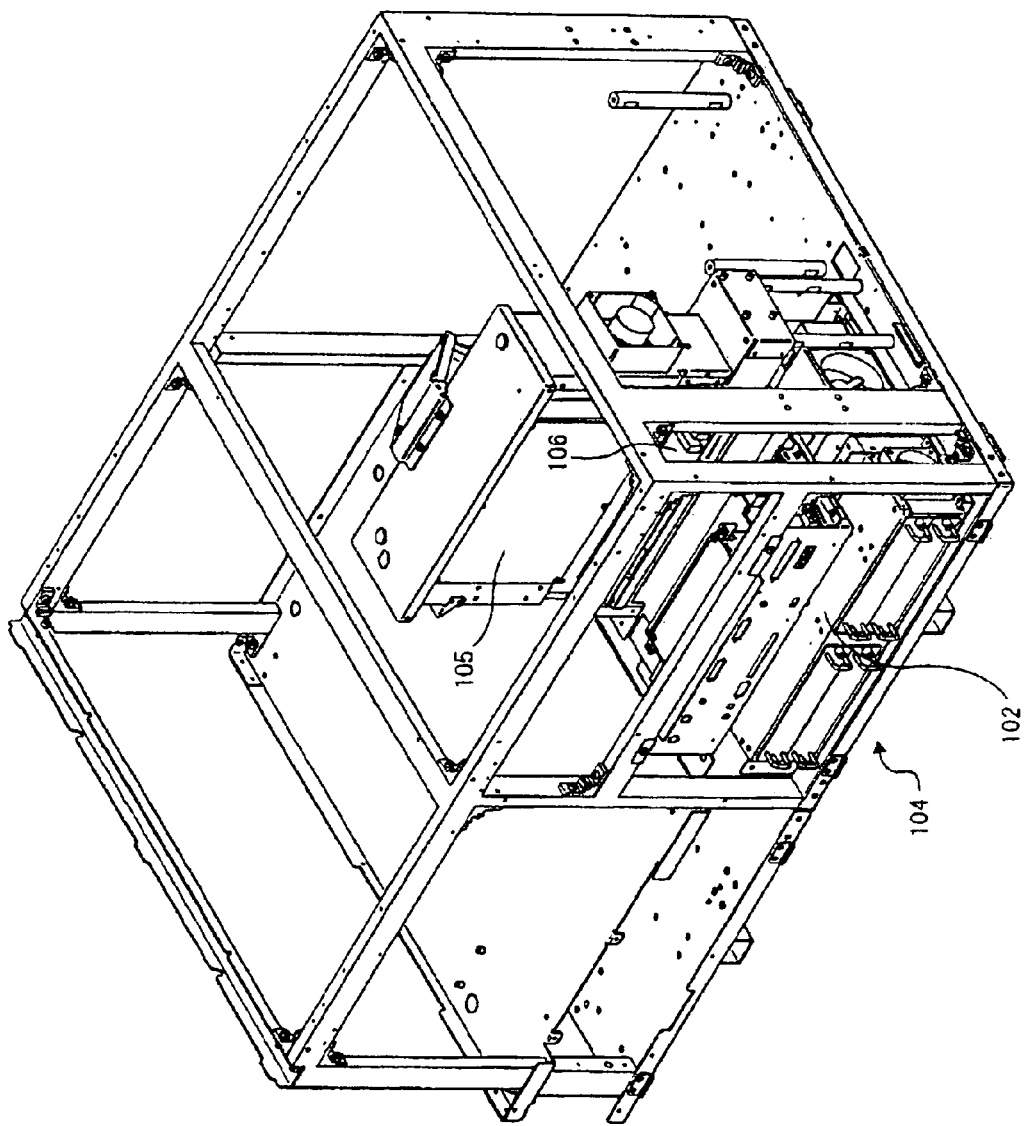
FIG. 1 An explanatory perspective view showing a projector related to the present invention.
Figure 2:
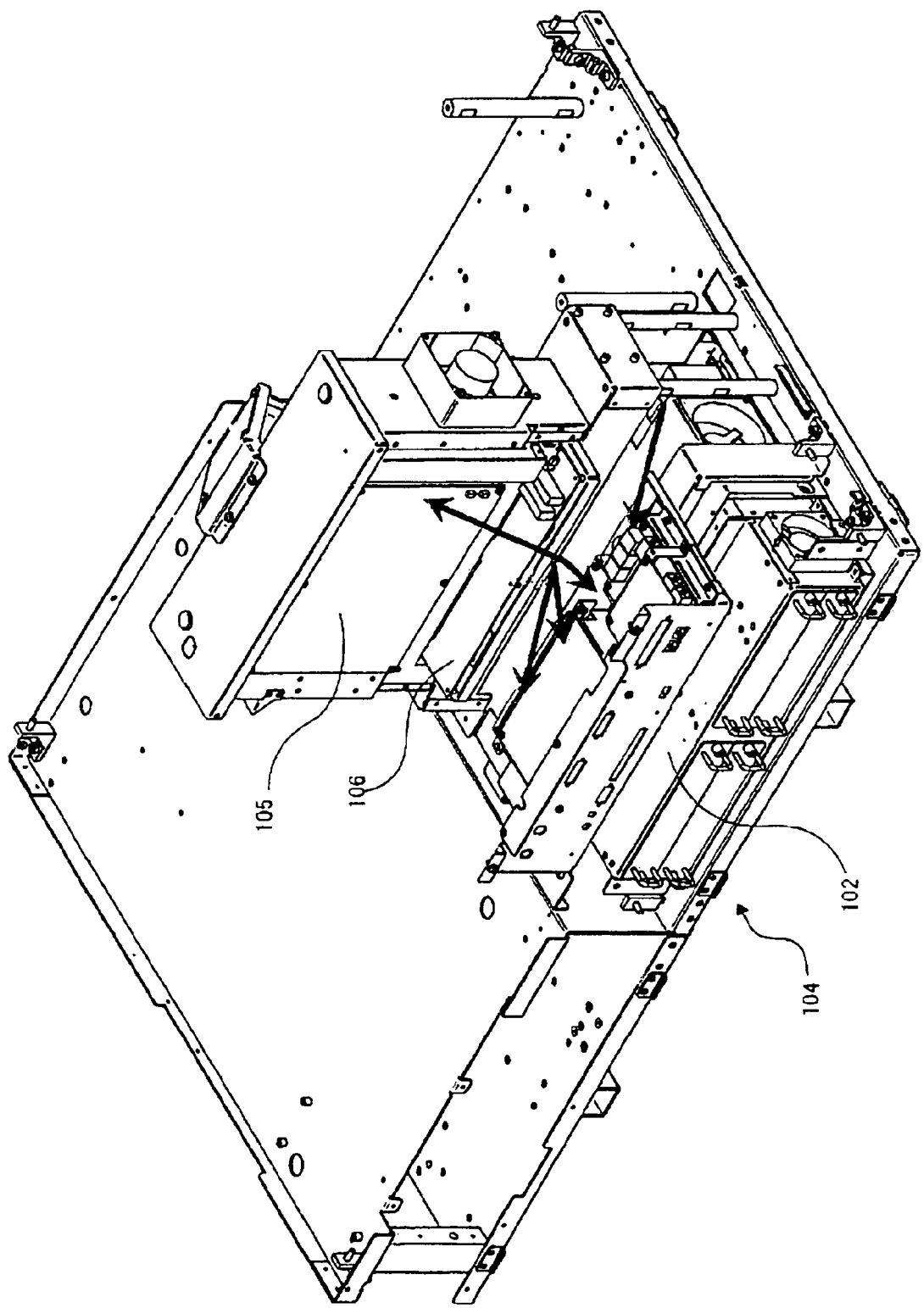
FIG. 2 An explanatory perspective view showing the projector related to the present invention.
Figure 3:
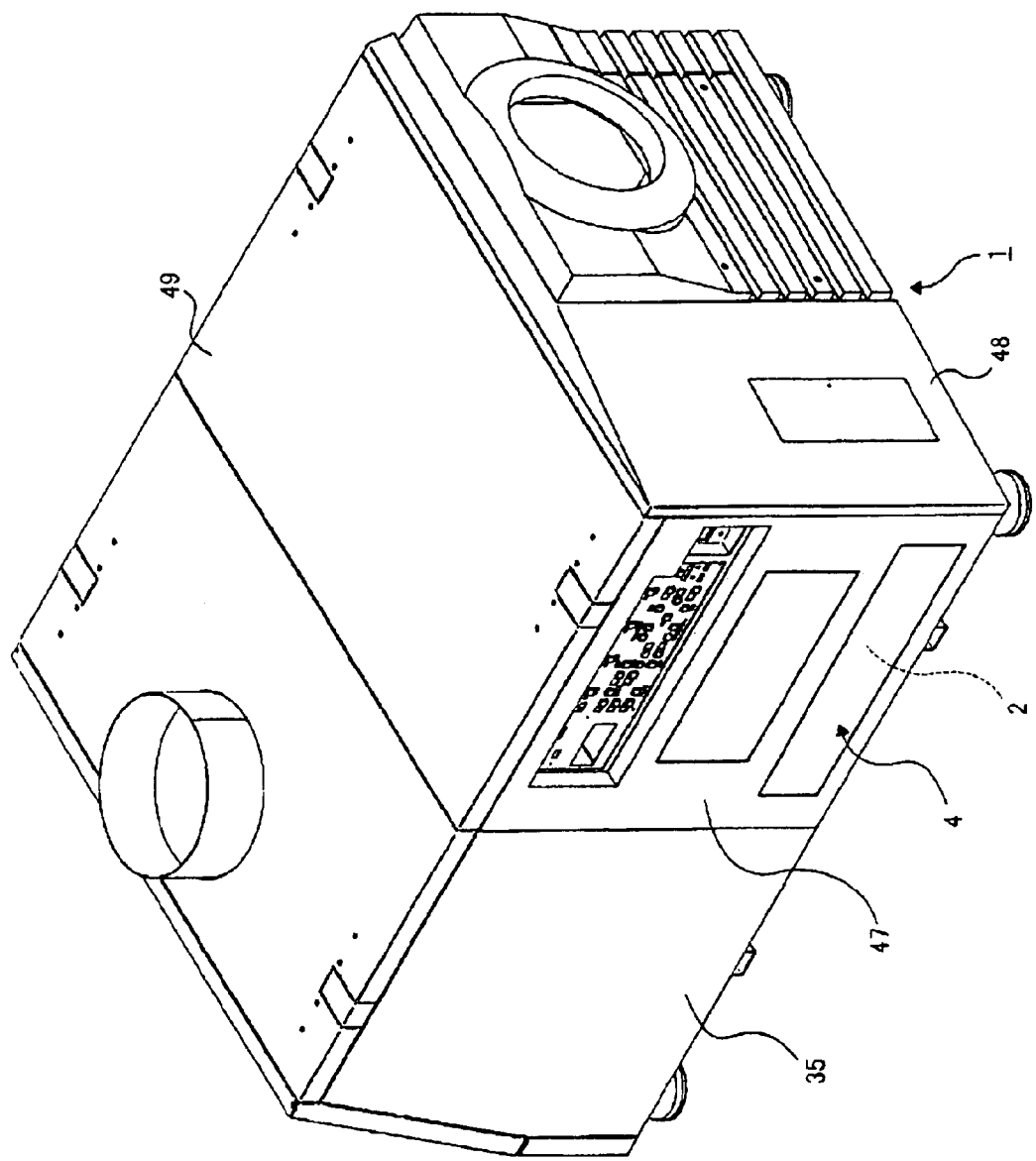
FIG. 3 A perspective view showing an entire projector according to an embodiment.
Figure 4:
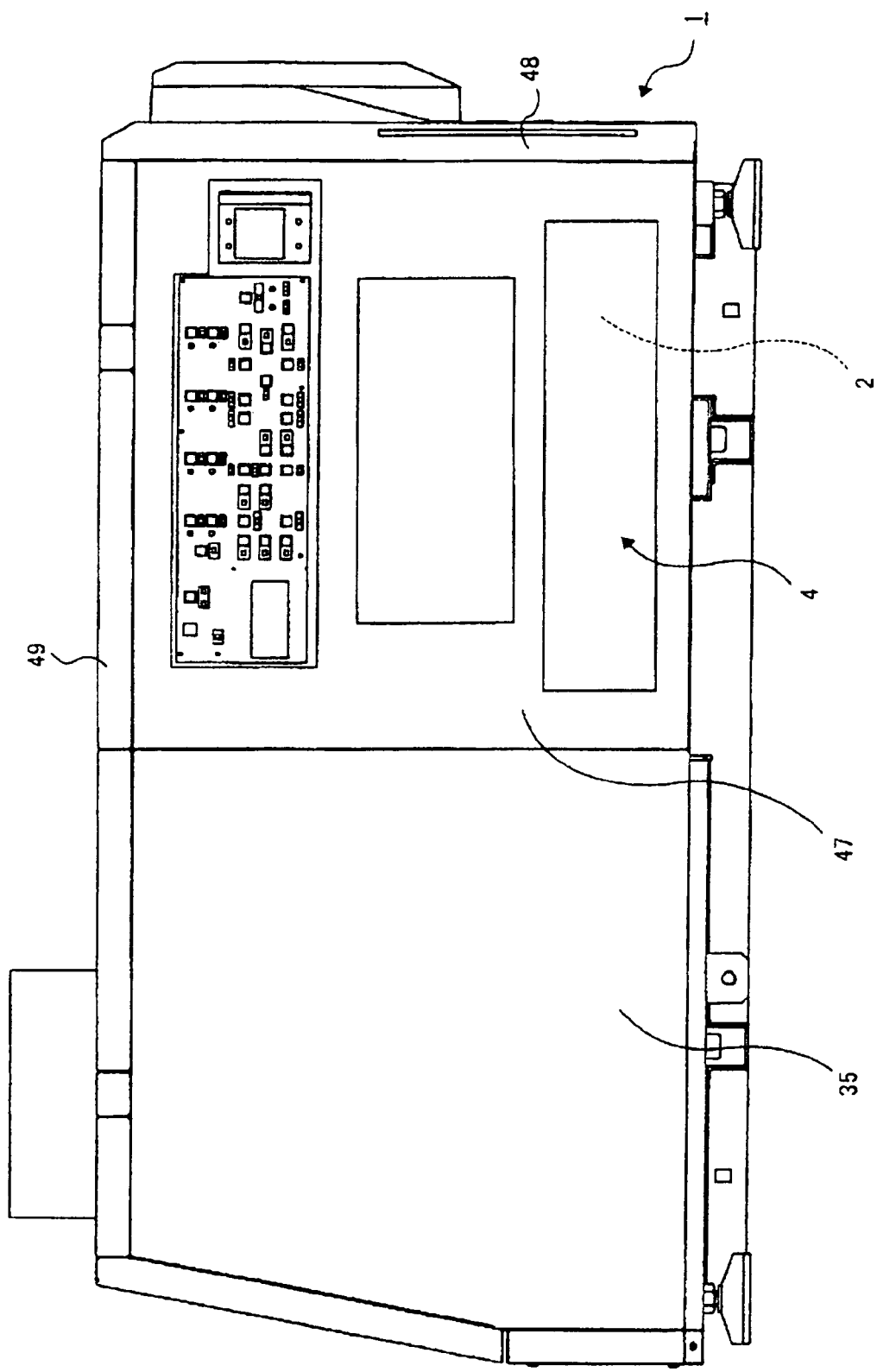
FIG. 4 A side view showing the projector according to the embodiment.

Hereinafter, specific embodiments of the present invention are described with reference to the drawings.

As shown in FIGS. 3 to 8, projector 1 according to an embodiment includes mounting unit 4 for selectively mounting optional unit 2 to extend functions installed beforehand. First, optional unit 2 mounted on projector 1 according to the embodiment is described referring to the drawings.

Figure 9:
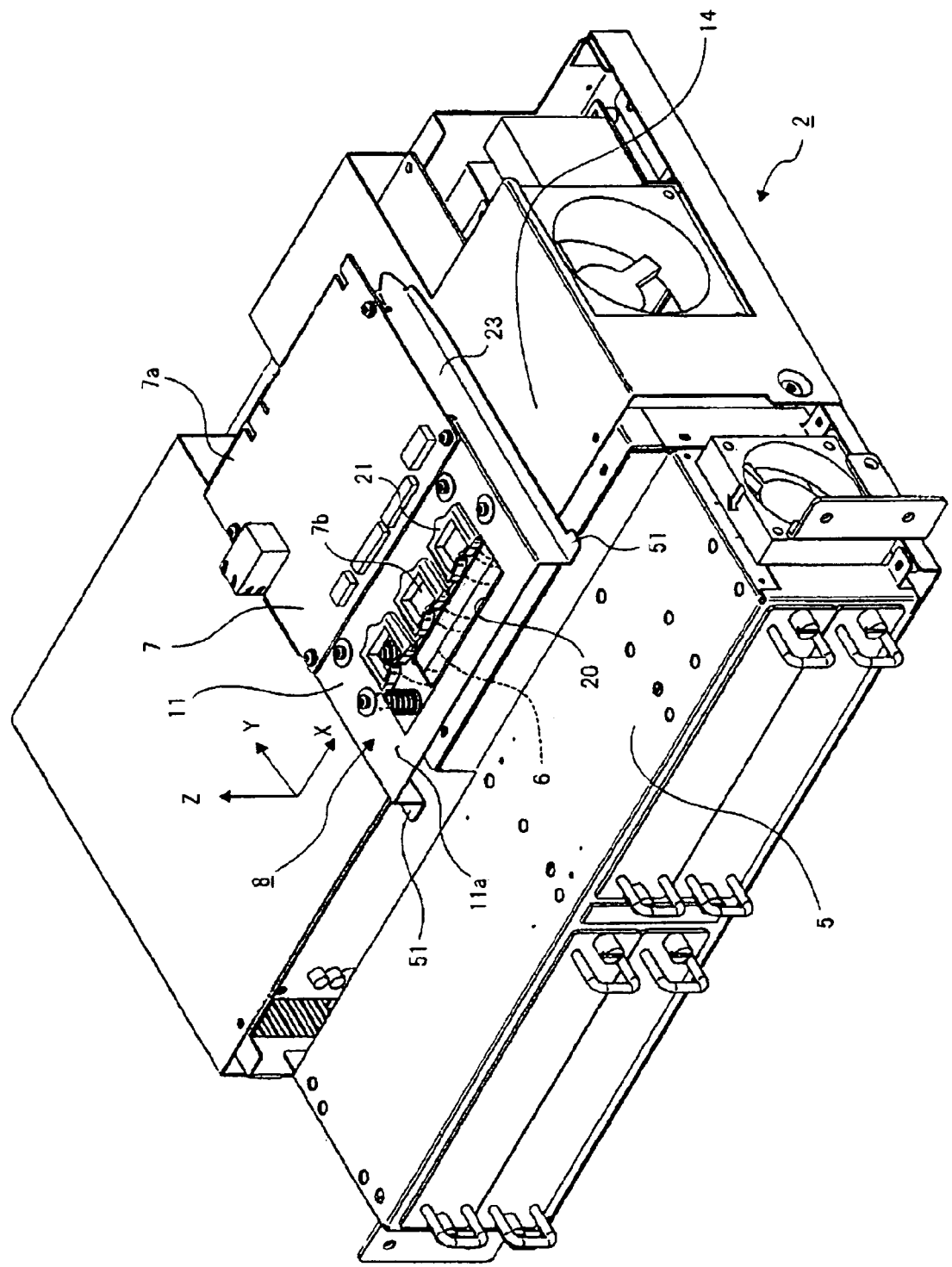
FIG. 9 A perspective view showing the optional unit.

As shown in FIG. 9, according to the embodiment, optional unit 2 includes, as extension function section 5, a plurality of extension slots on which, for example, extension boards are mounted, a fan for cooling the extension boards mounted on the extension slots, and a control circuit unit for controlling the extension boards and the fan. Optional unit 2 also includes connection substrate 7 electrically connected to the control circuit unit constituting extension function section 5 via cable 6.

At one end of connection substrate 7, terminal 7a is disposed to be electrically connected to a mother substrate located in projector 1. Optional unit 2 can function, when mounted on mounting unit 4, by electrically connecting terminal 7a to the mother substrate.

Optional unit 2 further includes support mechanism 8 for supporting connection substrate 7 to be movable in three axis directions. The three axis directions are an X axis, a Y axis, and a Z axis shown in FIG. 9.

Figure 10:
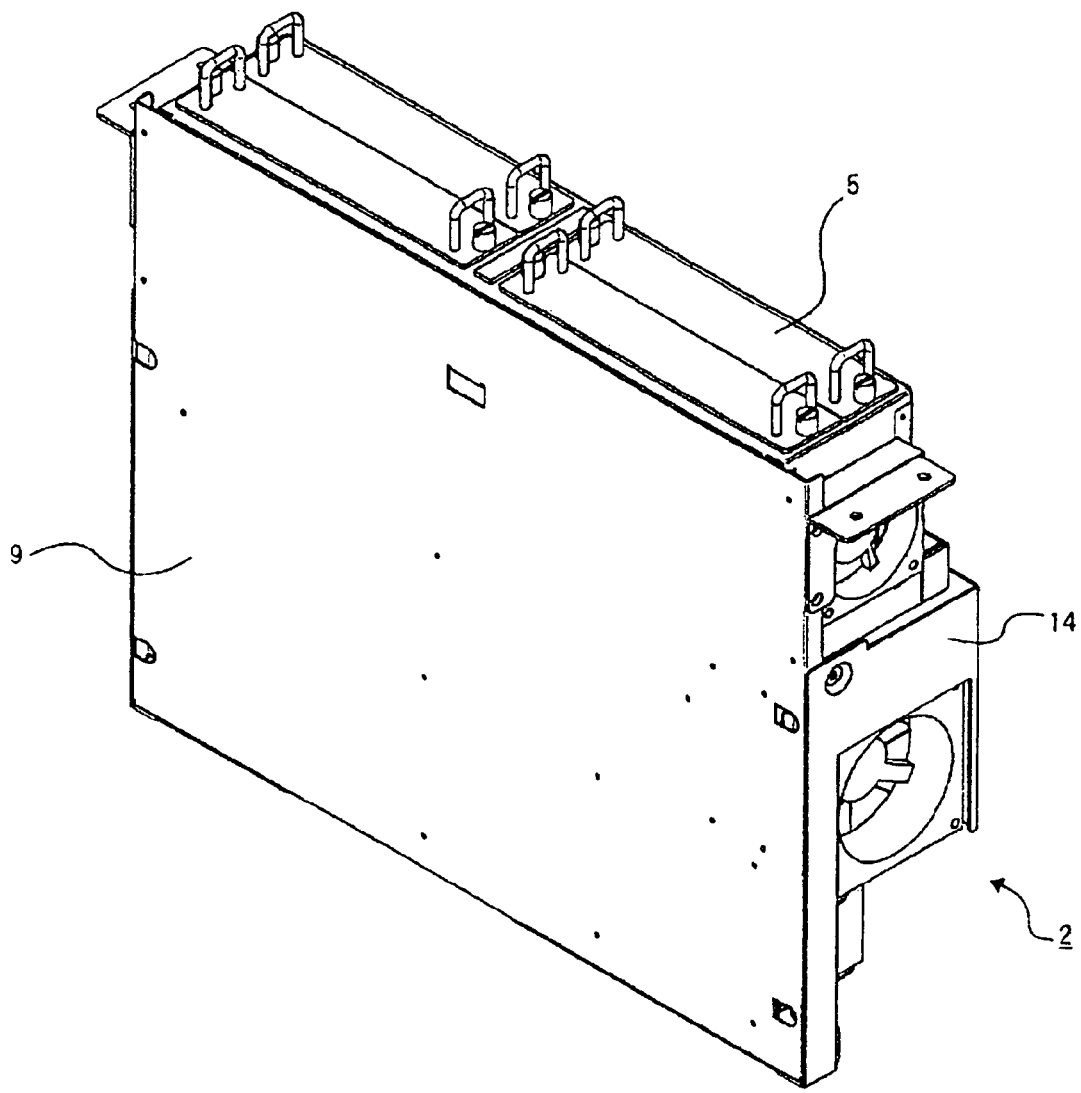
FIG. 10 A perspective view showing a bottom surface of the optional unit.

As shown in FIG. 10, optional unit 2 has, in bottom surface 9 opposite a bottom surface of mounting unit 4, no portion that protrudes from bottom surface 9 when mounted on mounting unit 4 of projector 1. Similarly, in the bottom surface of mounting unit 4, there is no portion that protrudes from the bottom surface. Thus, during the mounting of optional unit 2 on mounting unit 4, when bottom surface 9 of optional unit 2 is slid in parallel to the bottom surface of mounting unit 4, bottom surface 9 can be smoothly slid without colliding with the bottom surface of mounting unit 4.

Figure 11:
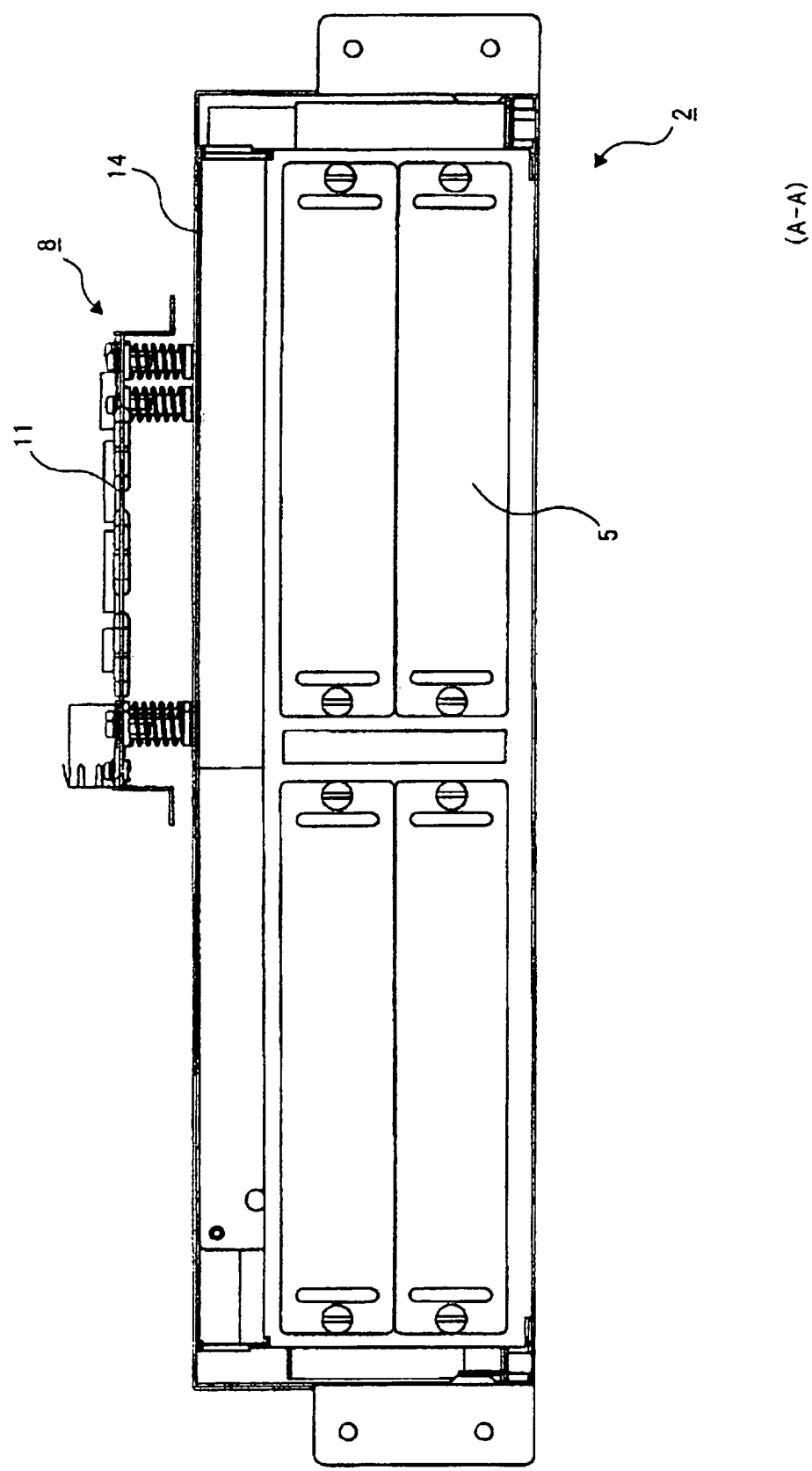
FIG. 11 A front view showing the optional unit.
Figure 12:
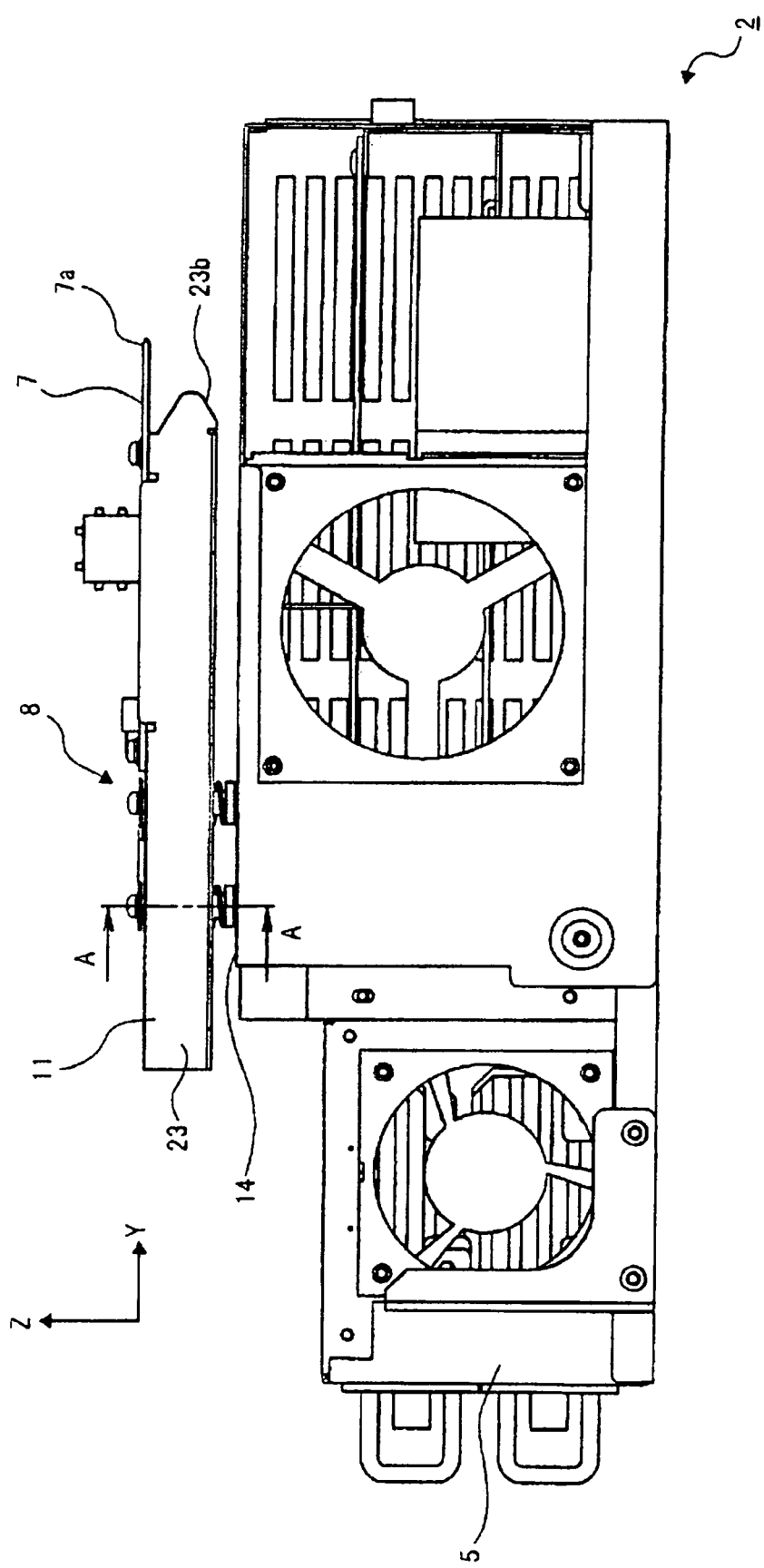
FIG. 12 A side view showing the optional unit.

As shown in FIGS. 11 and 12, support mechanism 8 of optional unit 2 includes hat-shaped metal fitting 11 serving as a substrate support member for supporting connection substrate 7, four spindles 12 for supporting hat-shaped metal fitting 11 to be movable in a thickness direction (Z axis direction) of connection substrate 7, four coil springs 13 serving as pressing members for pressing hat-shaped metal fitting 11 in the Z axis direction, and frame 14 on which spindles 12 are erected.

Connection substrate 7 is fixed to top board 11a of hat-shaped metal fitting 11 by screws. In top board 11a, shaft holes 16 are formed, which has inner diameters larger than outer diameters of spindles 12. Thus, by moving spindles 12 in shaft holes 16, hat-shaped metal fitting 11 can be moved in the X axis and Y axis directions, and positions of connection substrate 7 can be adjusted in the X axis and Y axis directions.

Figure 13:
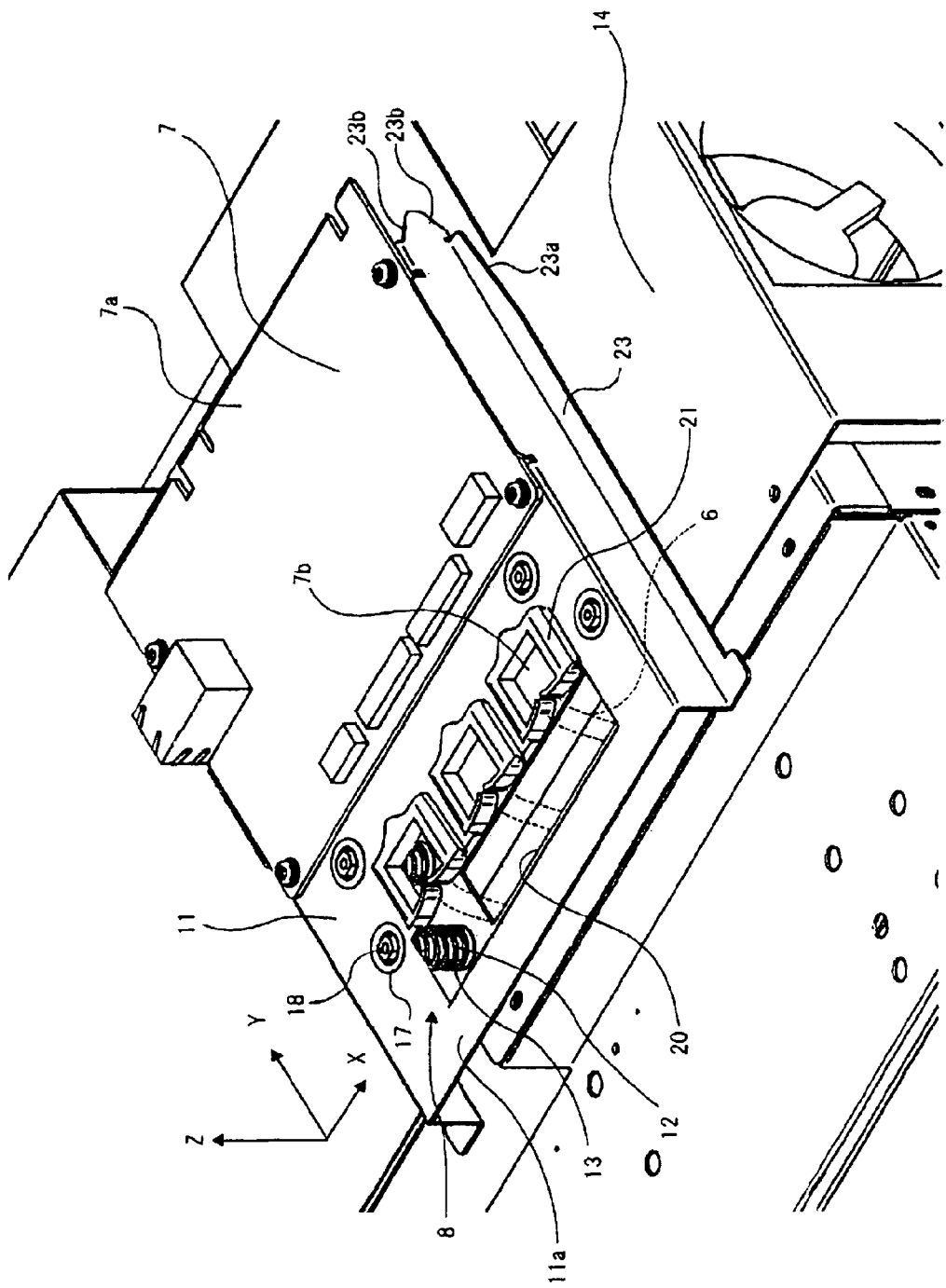
FIG. 13 A perspective view showing a support mechanism of a connection substrate.
Figure 14:
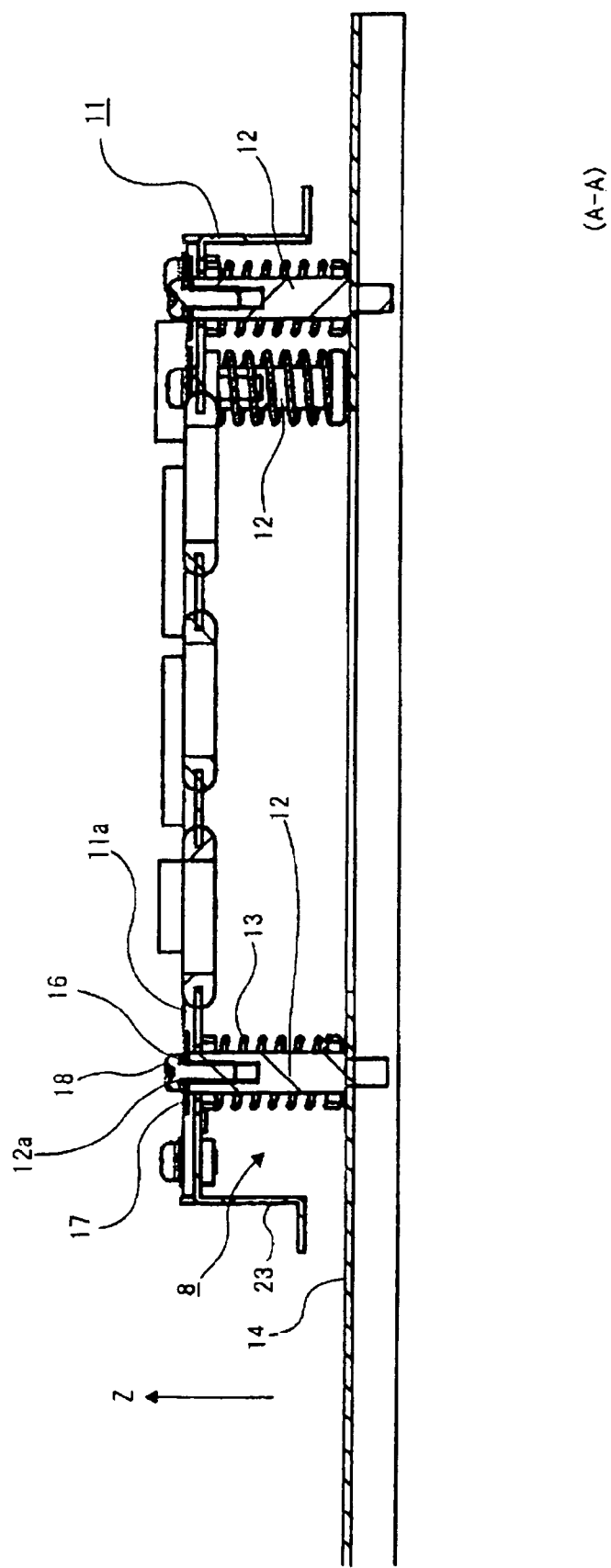
FIG. 14 A sectional view showing the support mechanism of the connection substrate.

As shown in FIGS. 13 and 14, four spindles 12 are equal in length, and screw hole 12a is formed at one end of each spindle 12. Plain washer 17 located on top board 11a is fixed to one end of each spindle 12 by screw 18 fitted in screw hole 12a. Thus, one end of spindle 12 is supported on an edge of shaft hole 16 of top board 11a to be slidable via plain washer 17.

Coil spring 13 is located on an outer circumference of spindle 12. An outer diameter of coil spring 13 is larger than an inner diameter of shaft hole 16. Thus, coil spring 13 has its both ends abutted on top board 11a and frame 14; and supports hat-shaped metal fitting 11 to be elastically displaceable in the Z axis direction with respect to frame 14. In other words, hat-shaped metal fitting 11 has its stop board 11a pressed upward in the axis direction of spindle 12 by an elastic force of coil spring 13. Hat-shaped metal fitting 11 can accordingly adjust a position of connection substrate 7 in the Z axis direction by depressing top board 11a against a pressing force of coil spring 13.

In top board 11a of hat-shaped metal fitting 11, as shown in FIG. 13, opening 20 is formed, through which a plurality of cables 6 electrically connected to extension function section 5 is pulled out. In positions adjacent to opening 20, a plurality of terminals 7b to which terminals of cables 6 are electrically connected are formed. Terminals 7b include clampers 21 for holding the terminals of cables 6. In optional unit 2, the terminals of cables 6 inserted into opening 20 beforehand are electrically connected to terminals 7b, and held by clampers 21. Thus, when optional unit 2 is mounted on mounting unit 4, cables 6 can be prevented from being stuck on mounting unit 4 to be destroyed.

Hat-shaped metal fitting 11 includes a pair of support pieces 23 formed by bending opposing both side edges into an L shape in cross-section. At an end of support piece 23 located on terminal 7a side of connection substrate 7, notch 23a where a width of a horizontal portion parallel to a mounting surface of connection substrate 7 is tapered is formed. At the end of support piece 23 located on terminal 7a side of connection substrate 7, notch 23b is formed at a corner of a vertical portion orthogonal to the mounting surface of connection substrate 7. Because of notches 23a and 23b formed at the end of support piece 23, hat-shaped metal fitting 11 can smoothly slide to mounting unit 4 of projector 1.

Figure 15:
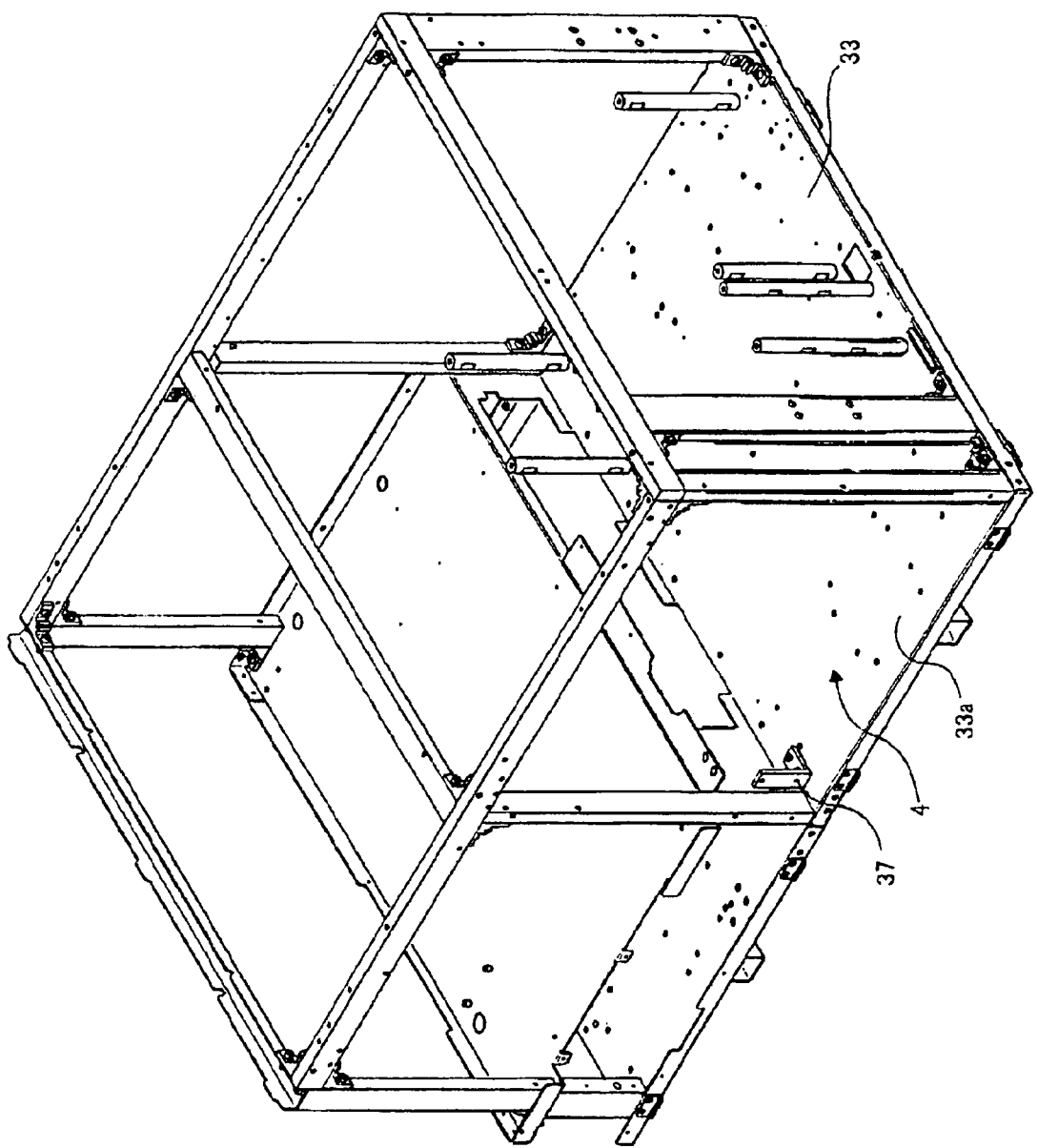
FIG. 15 A perspective view showing a chassis base.
Figure 16:
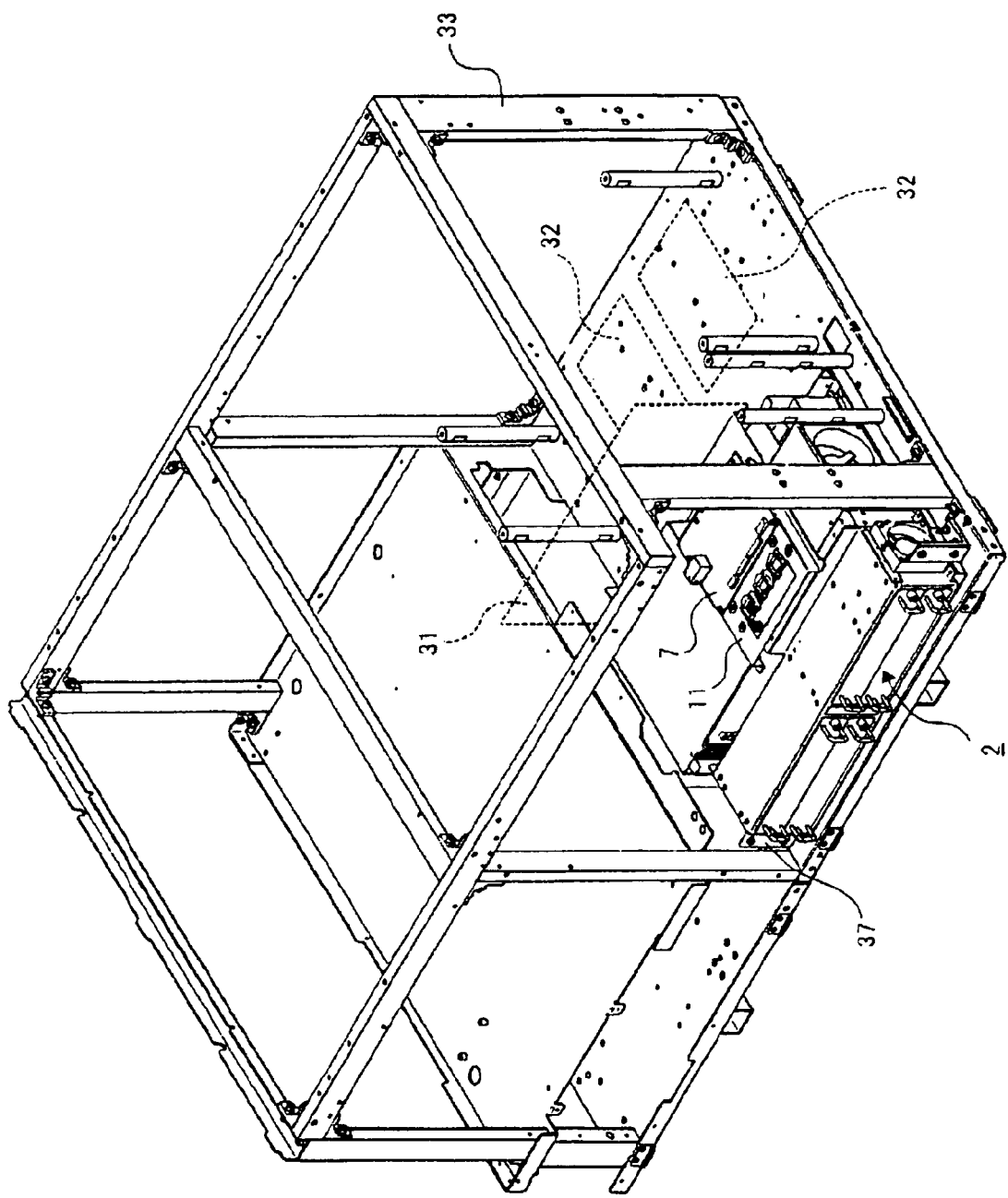
FIG. 16 A perspective view showing a fixed state of the optional unit to the chassis base.
Figure 17:
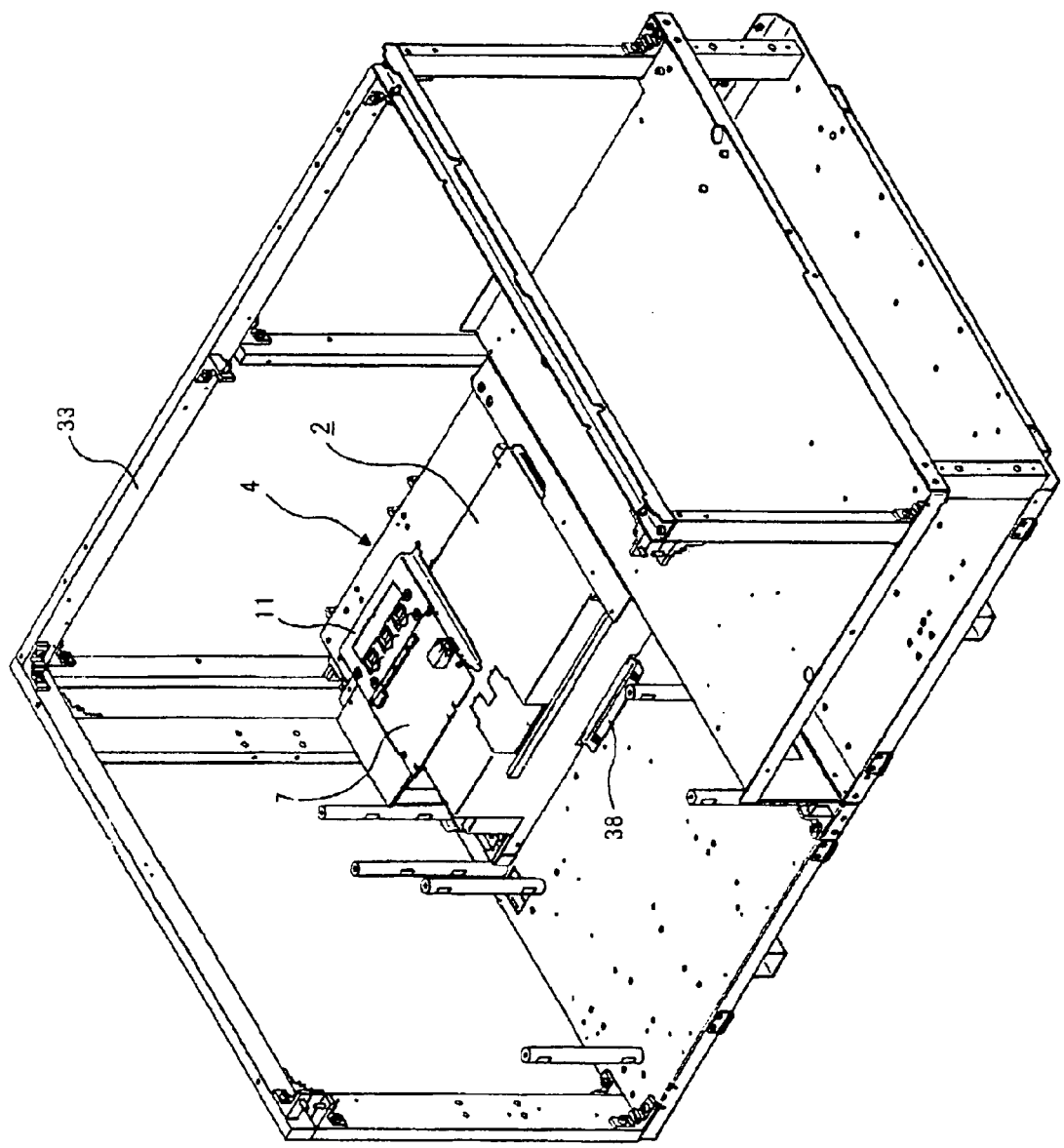
FIG. 17 A perspective view showing a fixed state of the optional unit to the chassis base.

As shown in FIGS. 15 to 17, projector 1 on which optional unit 2 configured as described above is mounted includes mother substrate 31 to which connection substrate 7 is connected, and chassis base 33 to which optional unit 2 is fixed. In chassis base 33, as shown in FIGS. 18 and 19, shield case 34 is disposed, which serves as a holding member for holding connection substrate 7 of optional unit 2 mounted on mounting unit 4.

Figure 19:
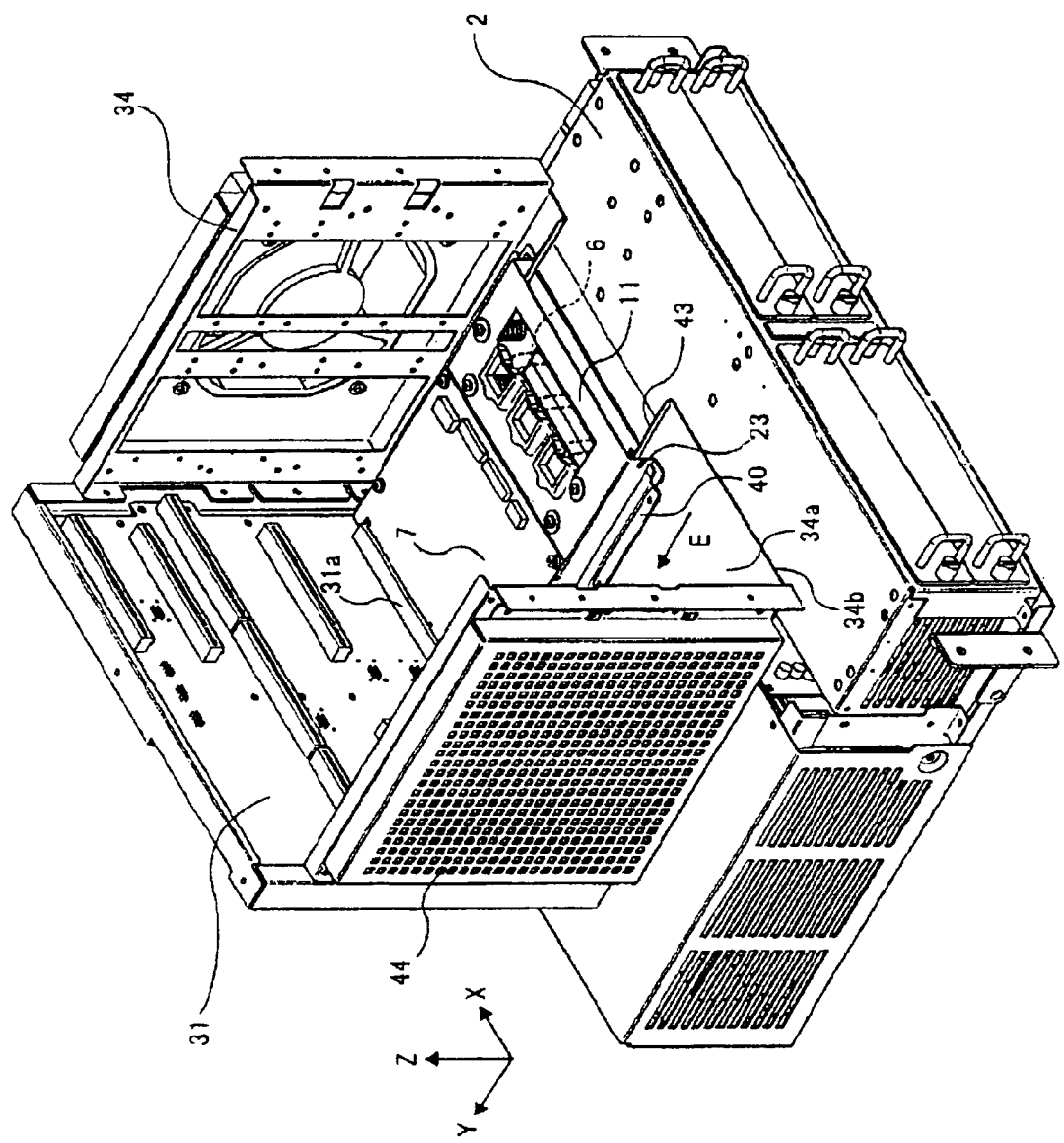
FIG. 19 A perspective view showing a guided state of the connection substrate of the optional unit by a Z-shaped guide metal fitting of the shield case.

As shown in FIG. 19, mother substrate 31 is erected to be fixed on shield case 34 in a state where its mounting surface is orthogonal to arrow direction E in which connection substrate 7 slides. On the mounting surface of mother substrate 31, connector 31a to which terminal 7a of connection substrate 7 is electrically connected is disposed. As shown in FIG. 16, mother substrate 31 is electrically connected to a plurality of sub-substrates 32 located in chassis base 33.

On bottom surface 33a of chassis base 33, a pair of L-shaped metal fittings 37 for fixing optional unit 2 is fixed in a position corresponding to mounting unit 4. On bottom surface 33a of chassis base 33, there is no portion constituting the bottom surface of mounting unit 4 and that protrudes from bottom surface 33a as described above. On bottom surface 33a of chassis base 33, as shown in FIG. 17, a bent metal fitting 38 is fixed, on which optional unit 2 inserted into mounting unit 4 abuts and which presses and fixes optional unit 2 to bottom surface 33a.

Figure 18:
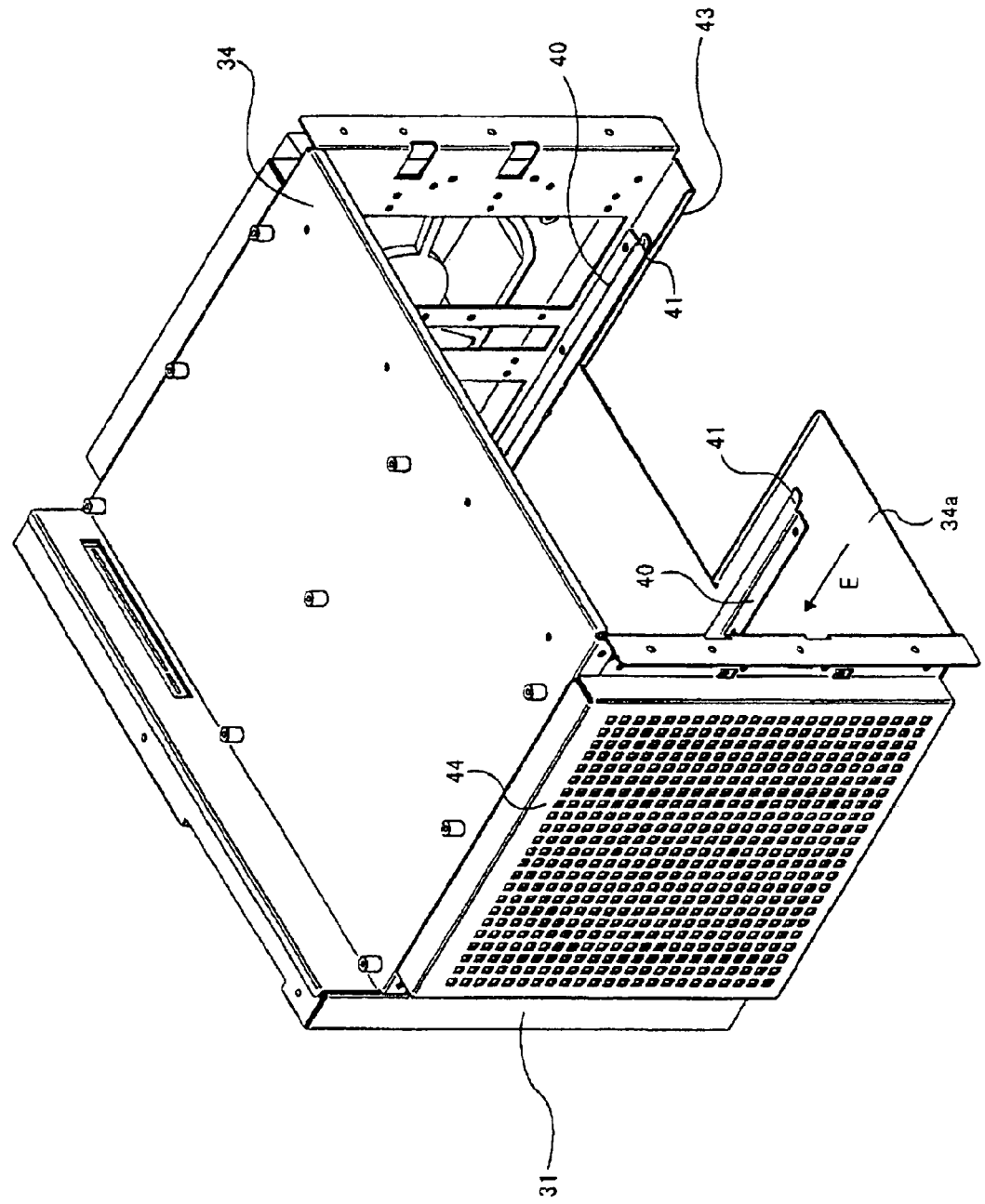
FIG. 18 A perspective view showing a shield case.
Figure 20:
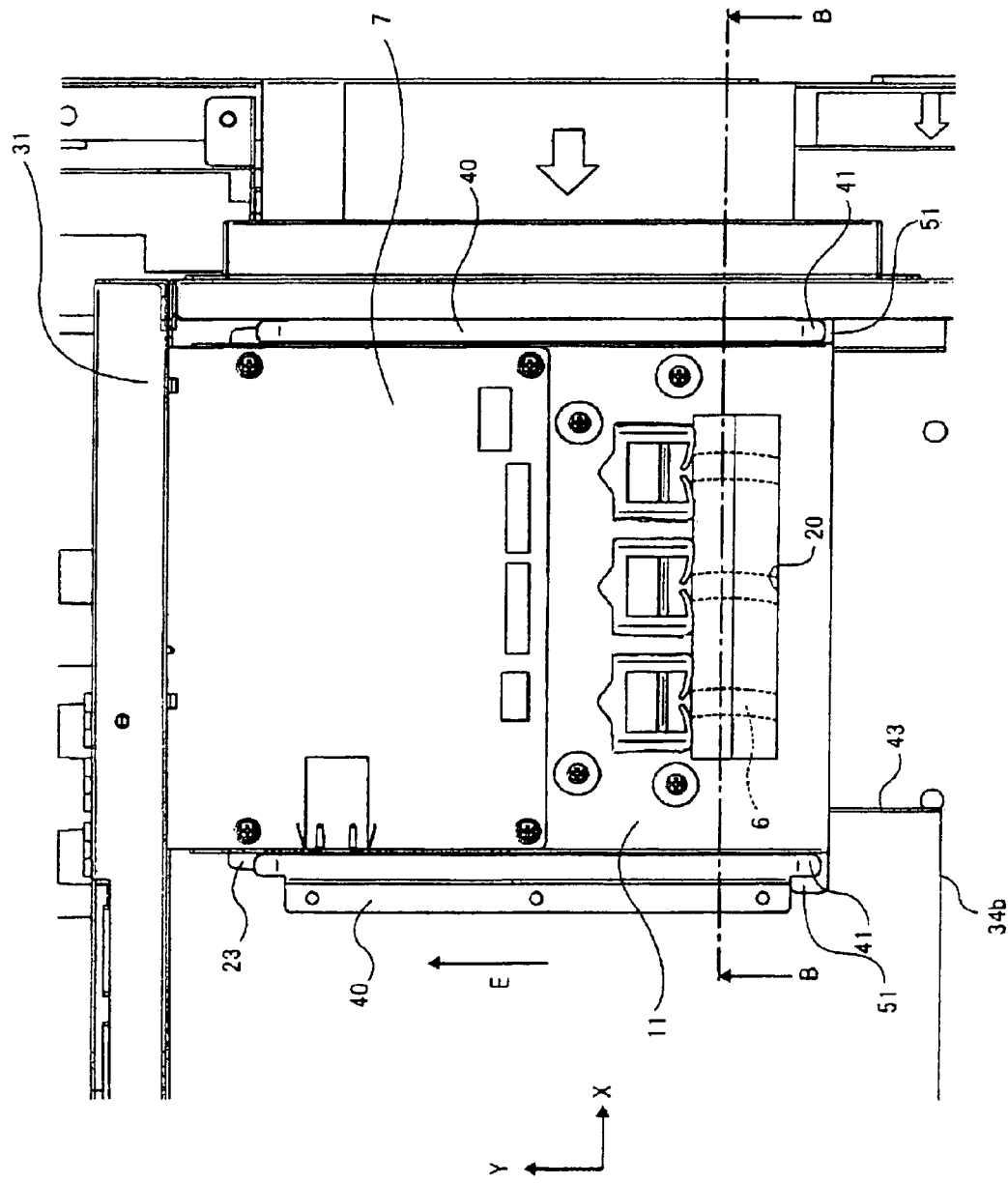
FIG. 20 A plan view showing an electrically connected state of the connection substrate of the optional unit to a mother substrate.

On bottom surface 33a of shield case 34, as shown in FIG. 18, a pair of Z-shaped guide metal fittings 40 are fixed, which serves as a guide member for guiding the pair of support pieces 23 of hat-shaped metal fitting 11 to be slidable to connector 31a of mother substrate 31. Z-shaped guide metal fittings 40 are, as shown in FIGS. 19 and 20, located in parallel to direction E in which optional unit 2 slides.

As shown in FIG. 18, Z-shaped guide metal fitting 40 includes guiding bent piece 41 formed at one end of a side in which hat-shaped metal fitting 11 is inserted. Support piece 23 of hat-shaped metal fitting 11 can be guided by bent piece 41 to be easily inserted into a groove of Z-shaped guide metal fitting 40.

On bottom surface 34a of shield case 34, notch 43 is formed in a position between the pair of Z-shaped guide metal fittings 40, which enables insertion of spindle 12 of support mechanism 11 included in optional unit 2 when optional unit 2 is inserted along Z-shaped guide metal fitting 40.

Shield case 34 has, as electromagnetic shielding means, wire-mesh structure 44 that uses, for example, a wire mesh or a punching metal. Shield case 34 can be made of, as electromagnetic shielding means, a conductive electromagnetic shielding material such as copper or conductive plastic.

Figure 5:
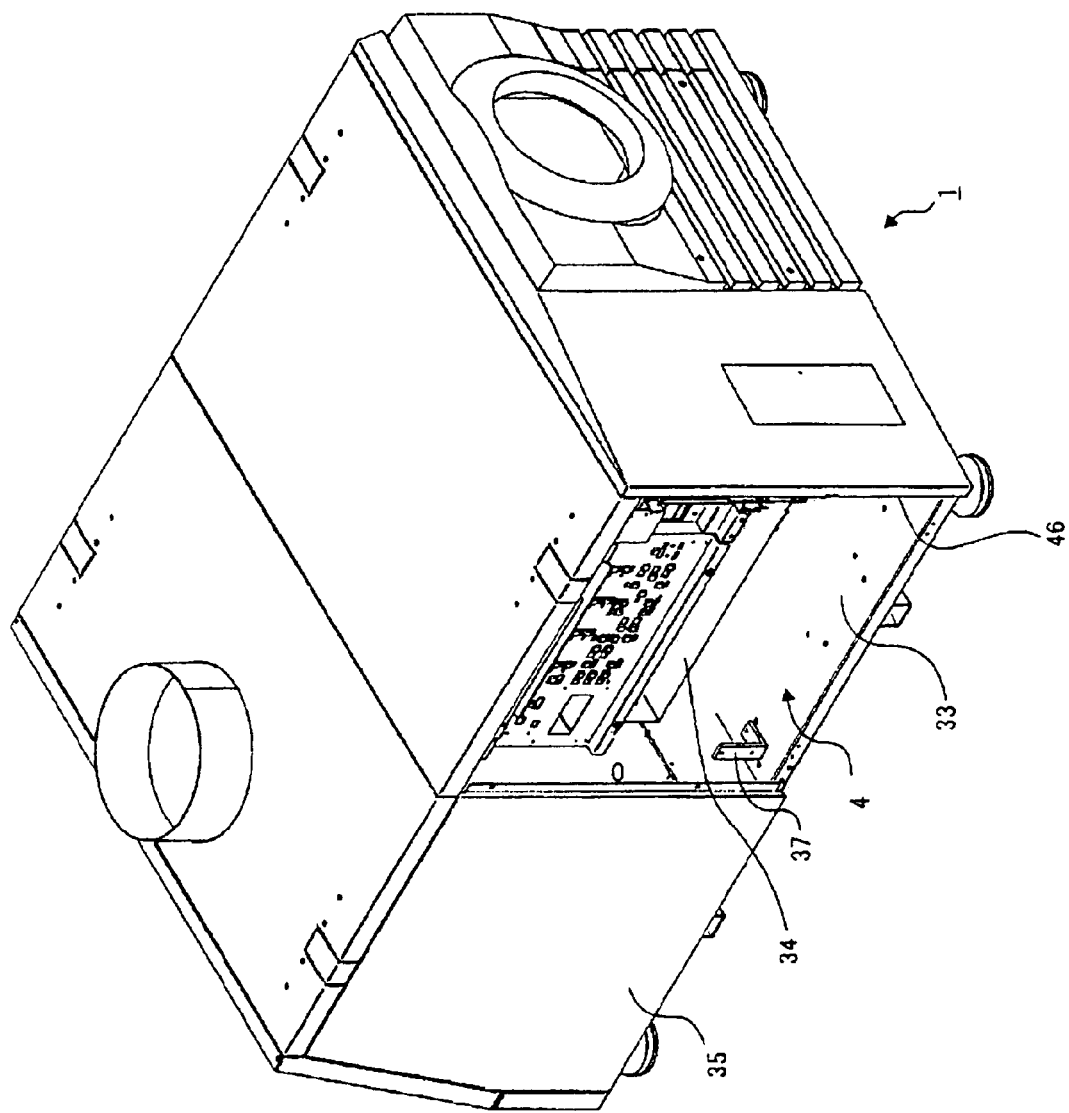
FIG. 5 A perspective view showing a removed state of a side panel from the projector according to the embodiment.
Figure 6:
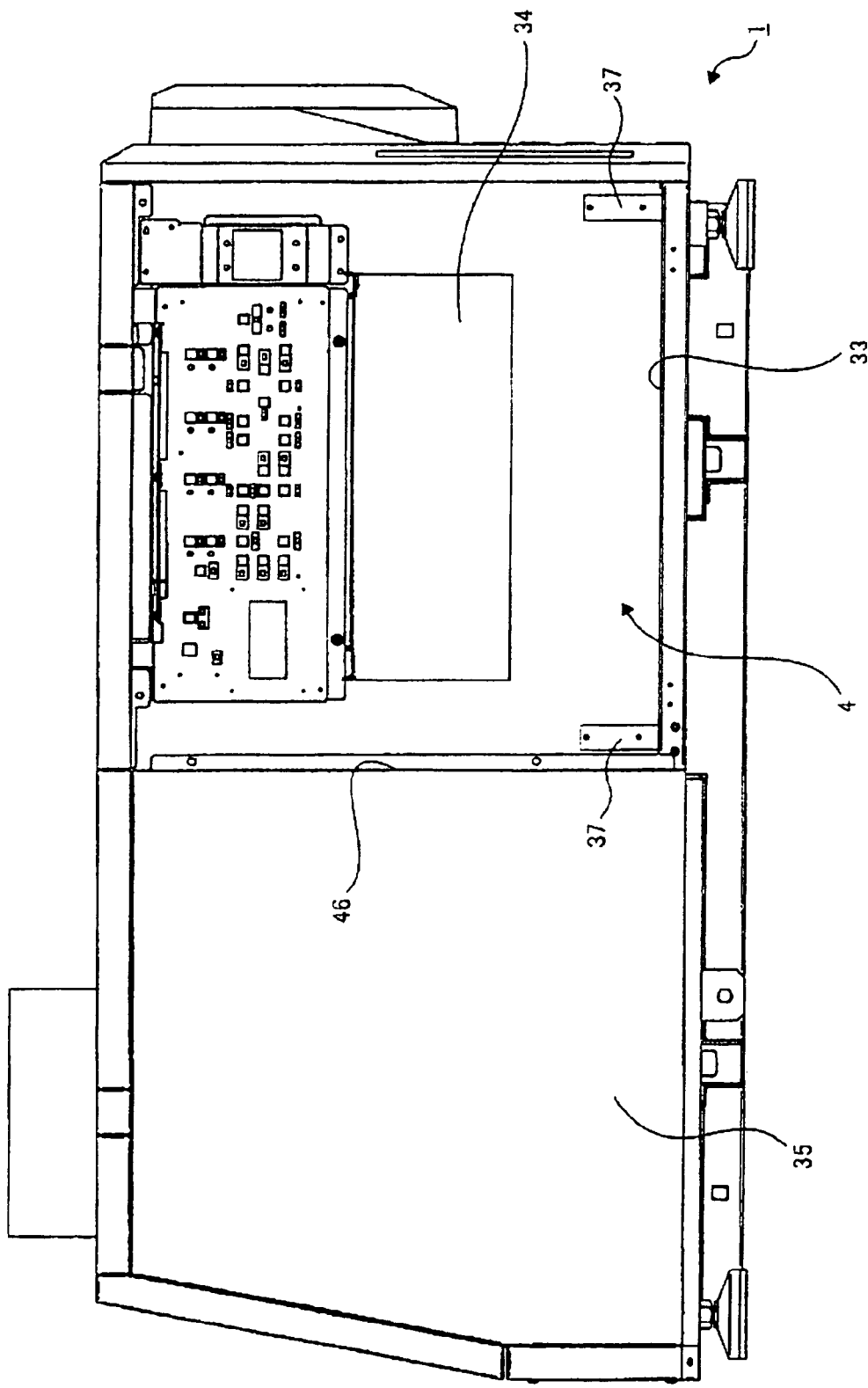
FIG. 6 A side view showing the removed state of the side panel from the projector according to the embodiment.
Figure 7:
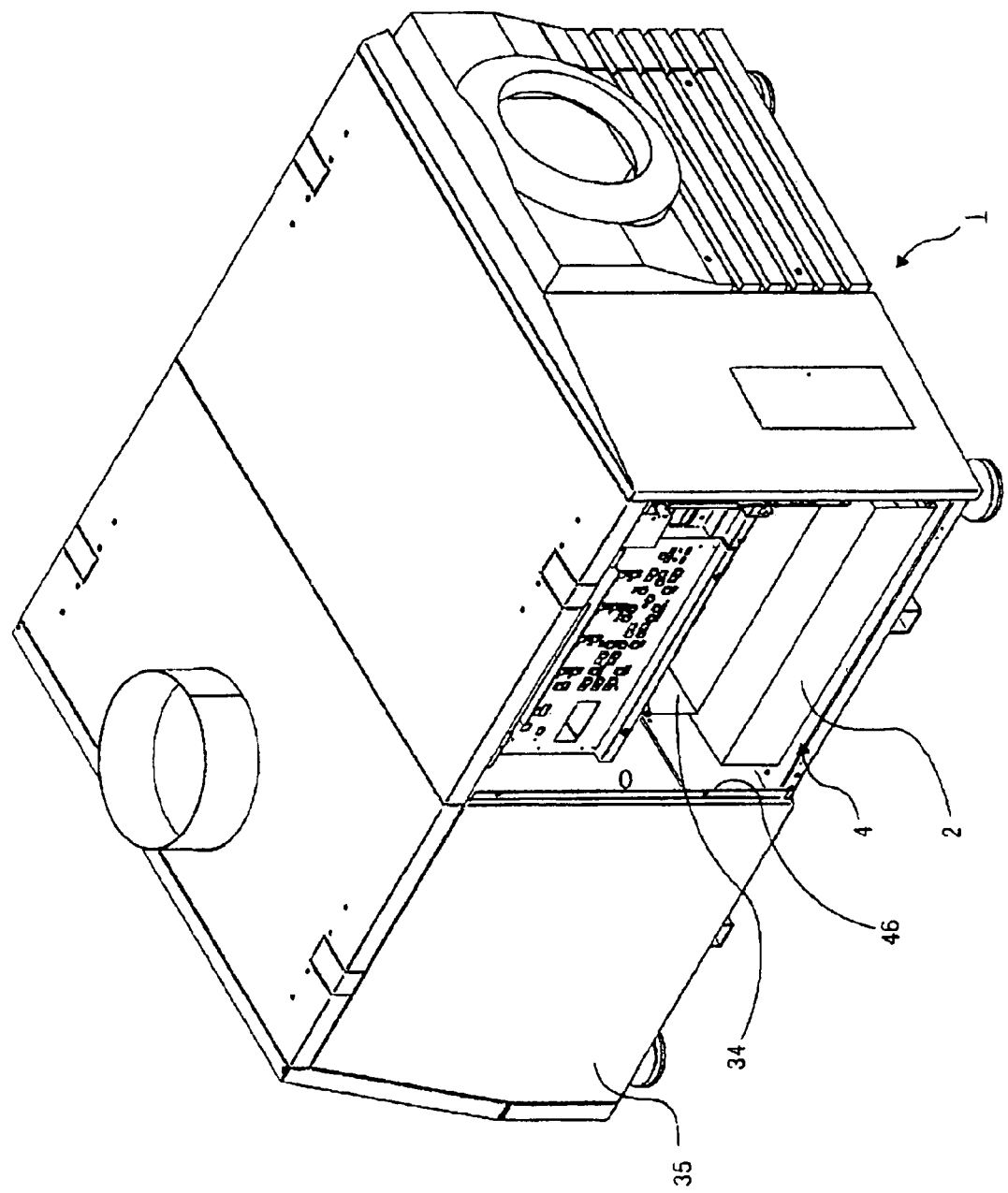
FIG. 7 A perspective view showing a mounted state of an optional unit on the projector according to the embodiment.
Figure 8:
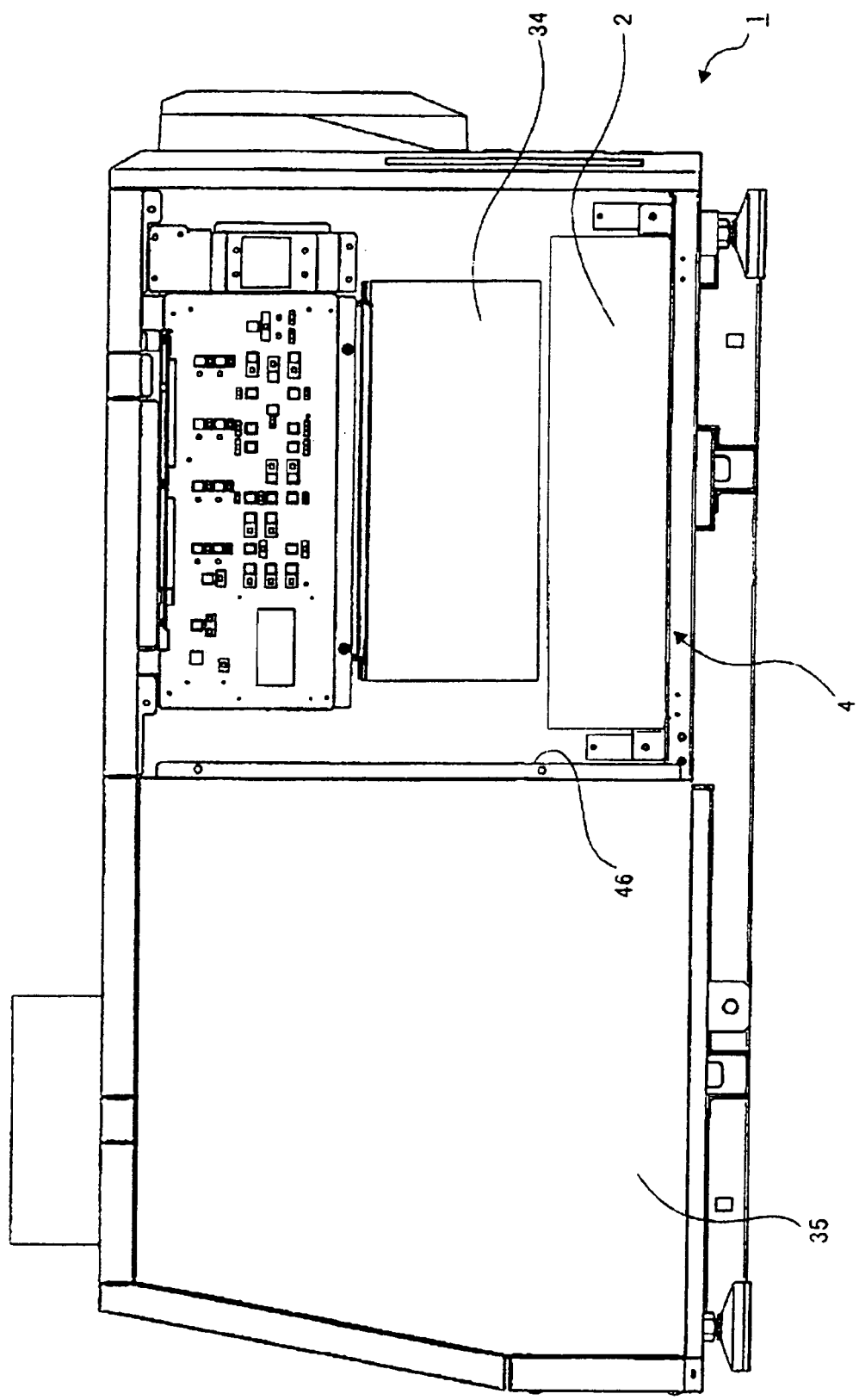
FIG. 8 A side view showing the mounted state of the optional unit on the projector according to the embodiment.

As shown in FIG. 5, projector 1 includes case 35 for covering chassis base 33. Mother substrate 31 and sub-substrate 32 are located in case 35. One side face of case 35 has opening 46 for inserting/removing optional unit 2 into/from case 35. Side panel 47 serving as a side surface member for covering opening 46 is removably located in opening 46. In case 35, front panel 48 and top panel 49 are removable located.

Projector 1 configured as described above according to the embodiment is described referring to an operation when optional unit 2 is mounted.

As shown in FIGS. 19 and 20, optional unit 2 inserted from opening 46 of case 35 is inserted by depressing hat-shaped metal fitting 11 against the pressing force of coil spring 13 and sliding support piece 23 of hat-shaped metal fitting 11 along Z-shaped guide metal fitting 40 of shield case 34 in direction E. In this case, because of notches 23a and 23b formed at the end of located on terminal 7a side of connection substrate 7, support piece 23 of hat-shaped metal fitting 11 is smoothly inserted into the groove of Z-shaped guide metal fitting 40, and positioned on bottom surface 34a of shield case 34.

Figure 21:
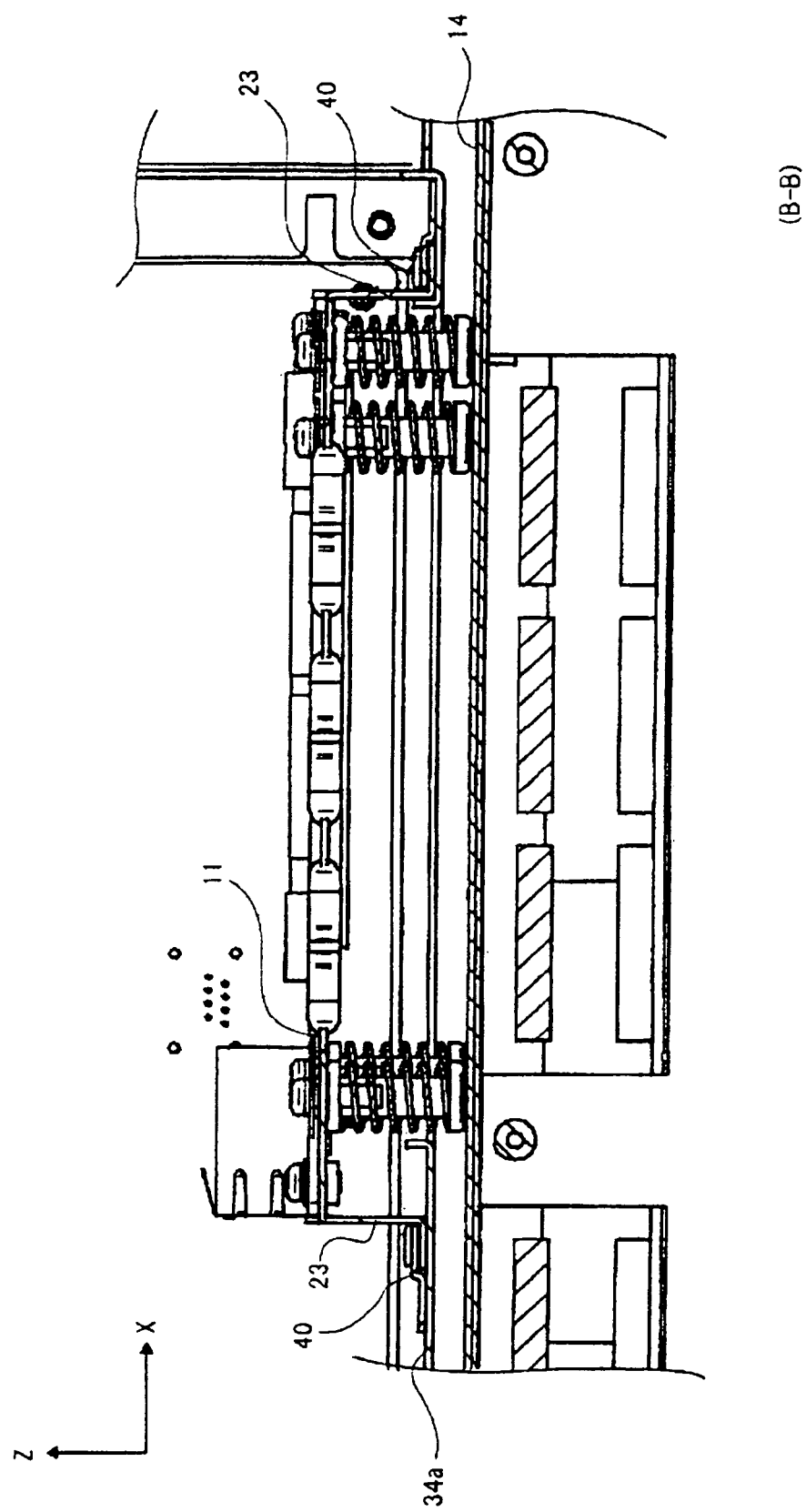
FIG. 21 A sectional view showing a positioned state of a hat-shaped metal fitting for supporting the connection substrate by the support mechanism.

As shown in FIG. 21, hat-shaped metal fitting 11 is positioned, by inserting the pair of support pieces 23 in the grooves of the pair of Z-shaped guide metal fittings 40, in the X axis direction by vertical portions of support pieces 23, and in the Z axis direction by horizontal portions of support pieces 23. Terminal 7a of connection substrate 7 is accordingly positioned with respect to connector 31a of mother substrate 31, and connection substrate 7 can be electrically connected to mother substrate 31 easily and surely.

As shown in FIG. 20, at a rear end of support piece 23 of hat-shaped metal fitting 11, abutment 51 is formed, which abuts on the end of Z-shaped guide metal fitting 40 when terminal 7a of connection substrate 7 is connected to connector 31a of mother substrate 31. Connection substrate 7 is accordingly positioned in direction E that is the Y axis direction, thereby preventing deep insertion of terminal 7a into connector 31a of mother substrate 31.

As a result, connection substrate 7 of optional unit 2 is highly accurately positioned in the three axis directions by support mechanism 8, hat-shaped metal fitting 11, and Z-shaped guide metal fitting 40.

In shield case 34 of projector 1, as shown in FIGS. 19 and 20, dummy panel 52 is removably disposed, which functions to cover end 34b of shield case 34 at which notch 43 is formed to hide it from the outside, and it hides notch 43 from the outside of projector 1 by covering a part of notch 43.

Figure 22:
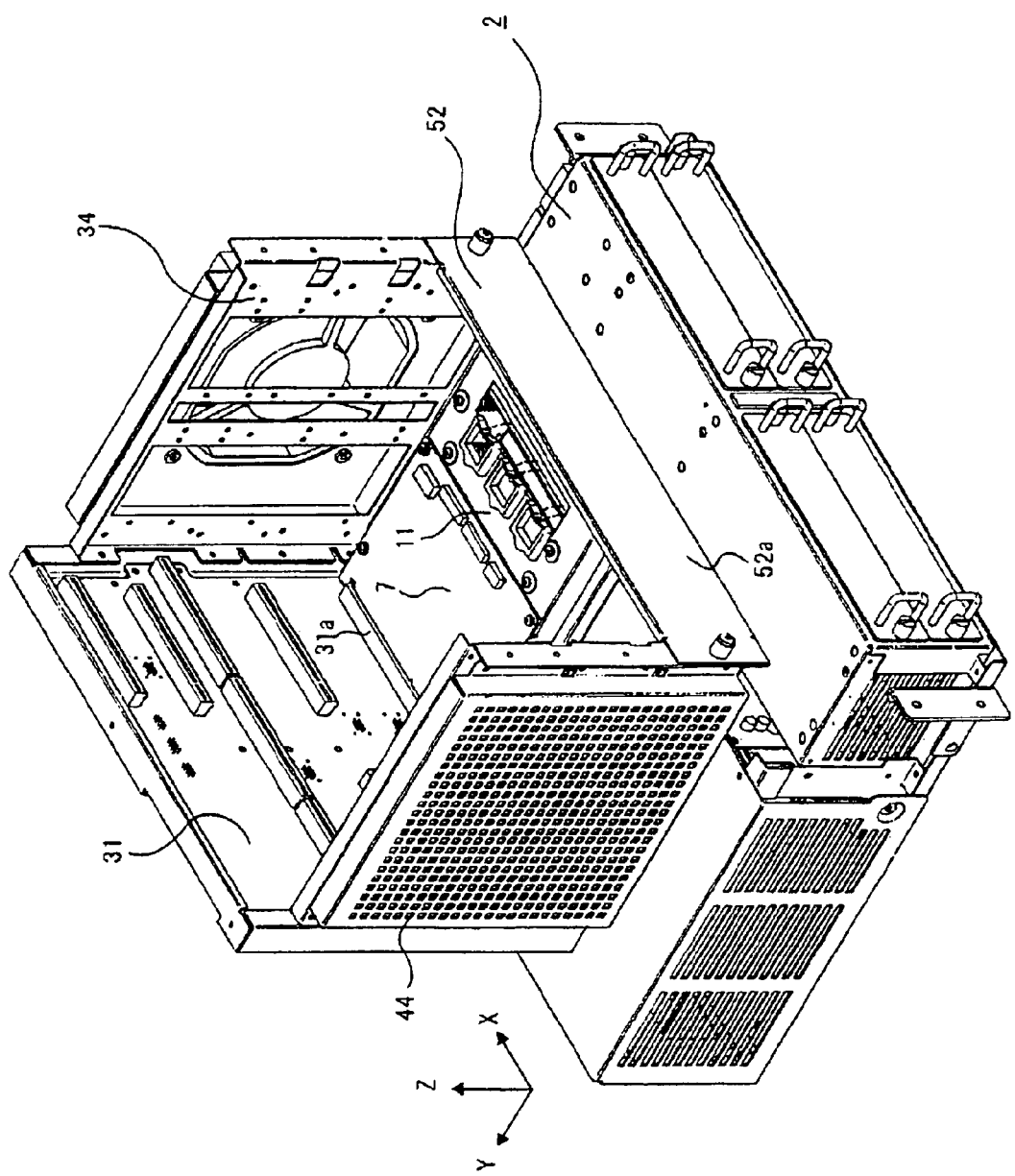
FIG. 22 A perspective view showing a state in which the connection substrate and a dummy panel are fixed to the shield case.
Figure 25:
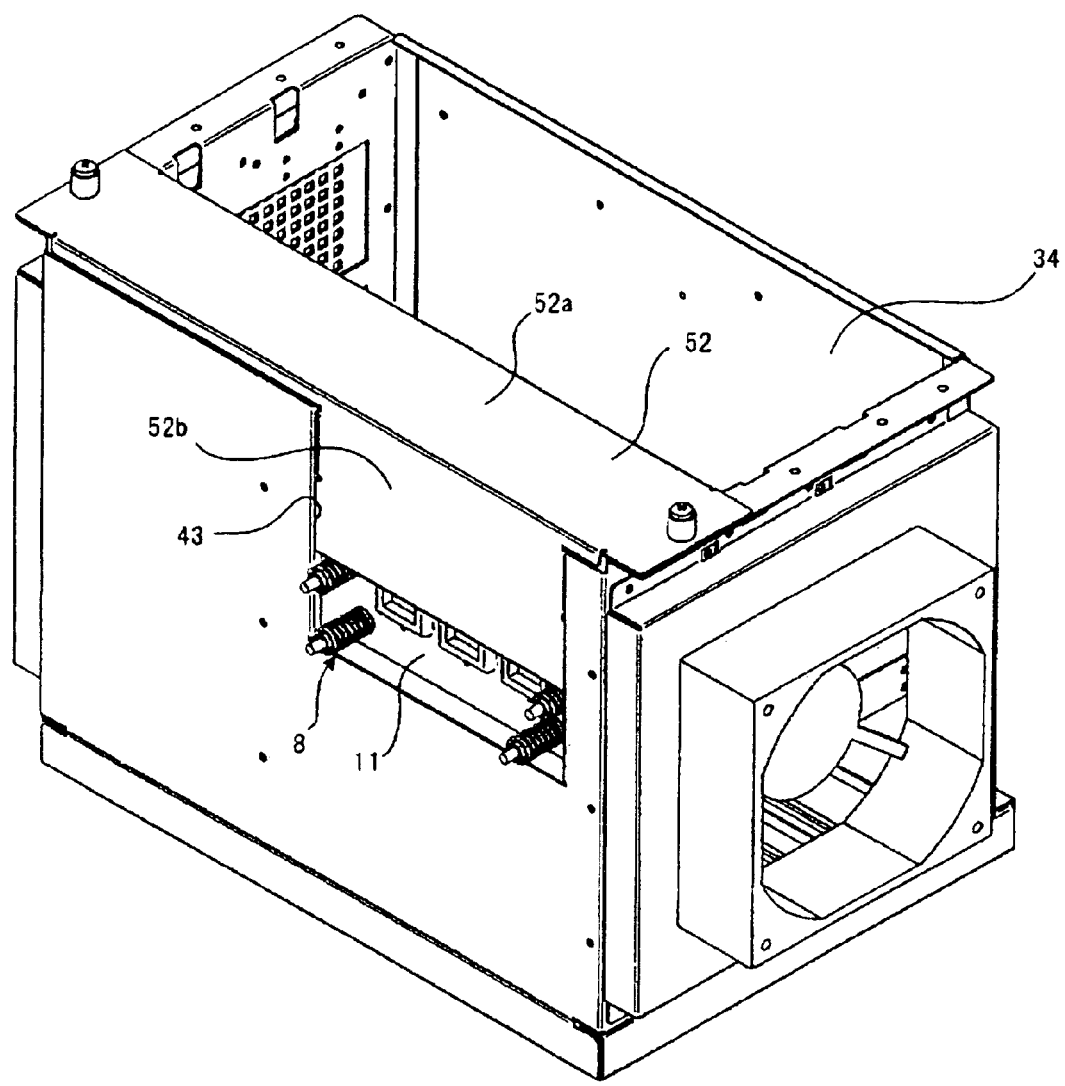
FIG. 25 A perspective view showing a state of covering a part of a notch of the shield case with the dummy panel.

As shown in FIGS. 22 and 25, dummy panel 52 includes panel 52a for covering the end side of shield case 34, and cover 52b for covering a part of notch 43. Dummy panel 52 is fixed to shield case 34 when optional unit 2 is not mounted on mounting unit 4. However, even in a mounted state of optional unit 2 on mounting unit 4, dummy panel 52 can be fixed to shield case 34.

Figure 23:
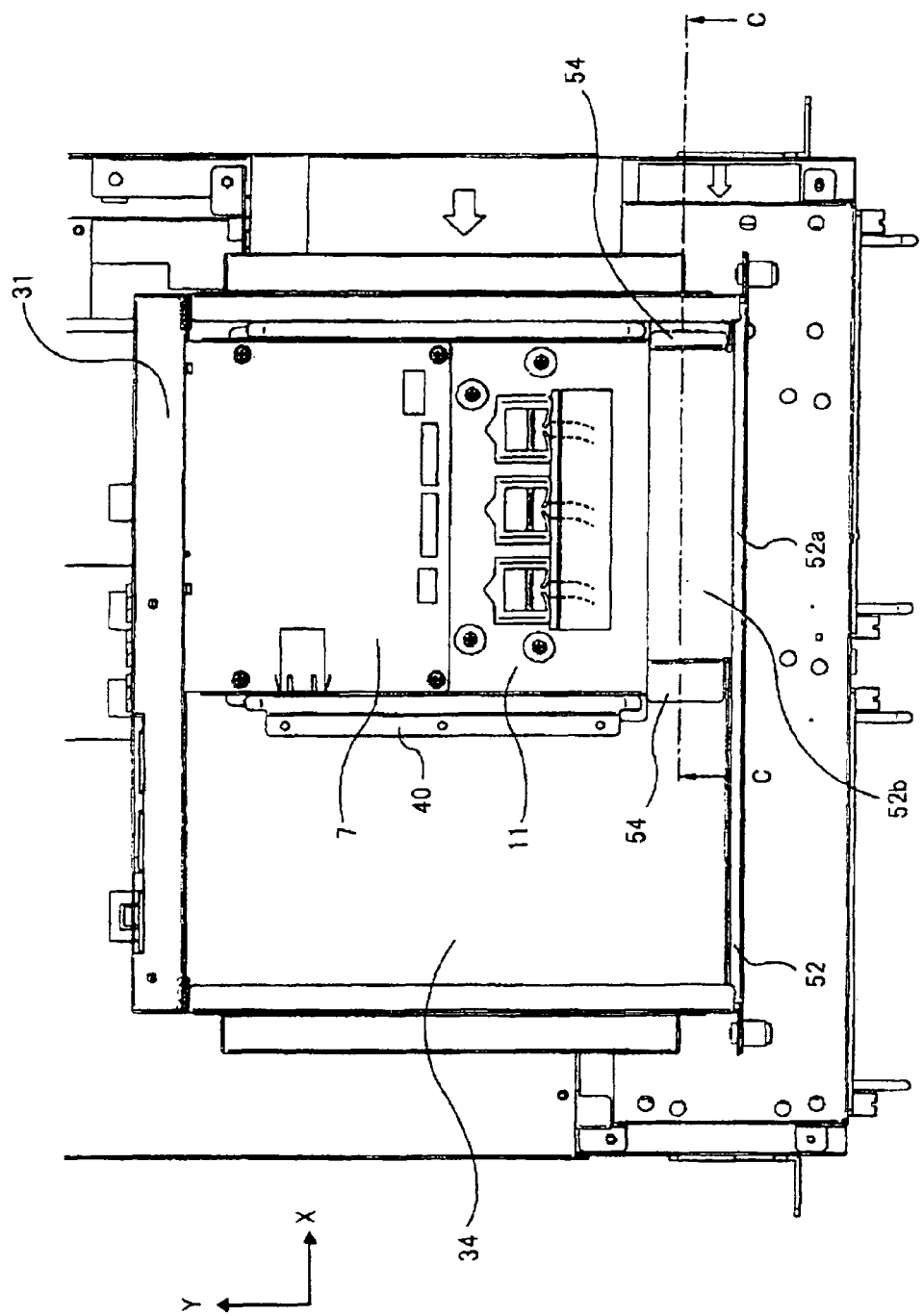
FIG. 23 A plan view showing the state in which the connection substrate and the dummy panel are fixed to the shield case.
Figure 24:
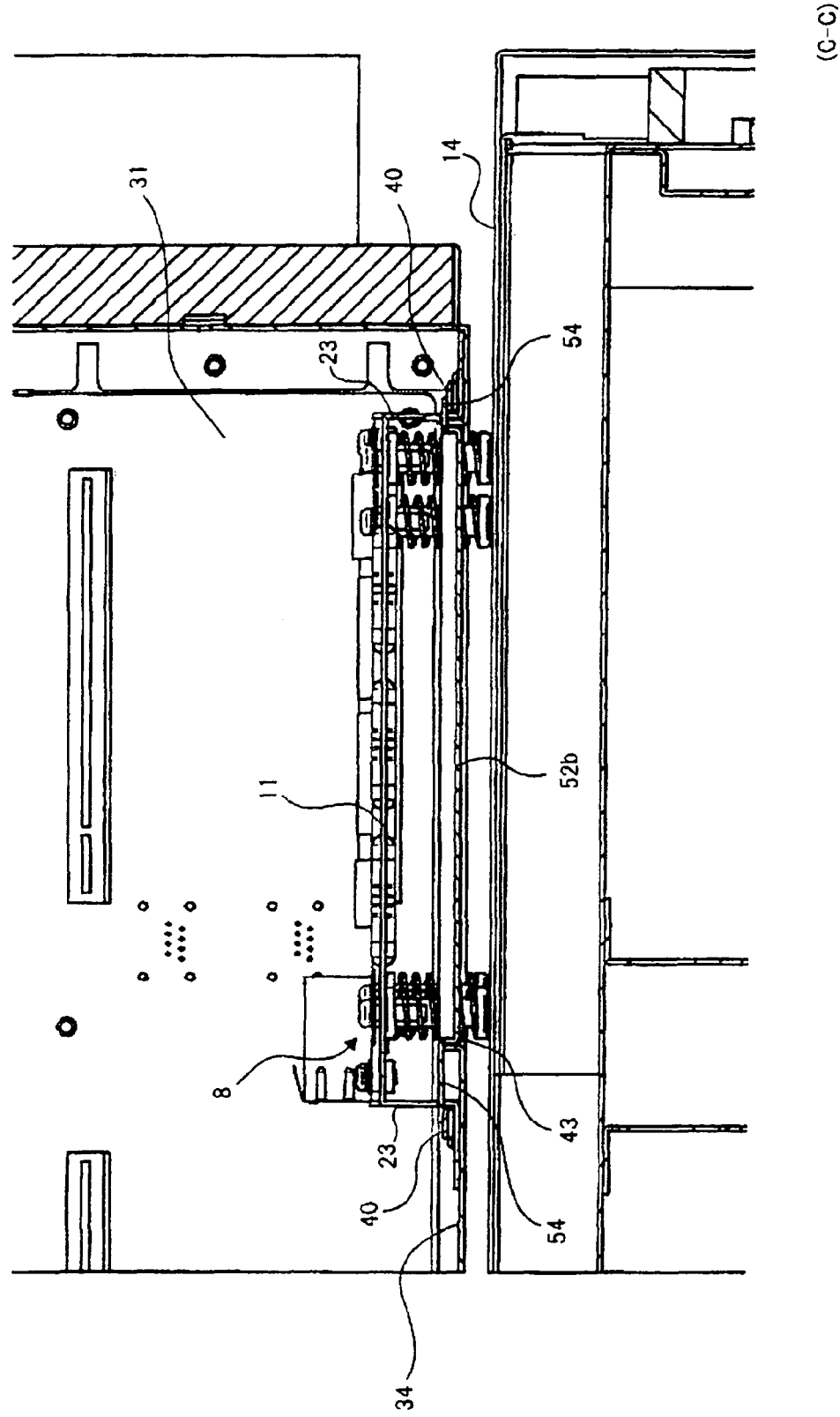
FIG. 24 A sectional view showing the state in which the connection substrate and the dummy panel are fixed to the shield case.

As shown in FIGS. 23 and 24, in cover 52b of dummy panel 52, abutment 54 is formed in a position corresponding to each support piece 23 of hat-shaped metal fitting 11 to position support piece 23 in the Z axis direction.

In dummy panel 52, in the mounted state of optional unit 2 on mounting surface 4, both ends of cover 52b are guided along Z-shaped guide metal fitting 40 to be inserted, and each abutment 54 presses each support piece 23 of hat-shaped metal fitting 11 to bottom surface 34a side of shield case 34. Dummy panel 52 accordingly regulates a position of connection substrate 7 having its terminal 7a electrically connected to connector 31a of mother substrate 31 in the Z axis direction.

In addition, the end of cover 52b of dummy panel 52 is abutted on the end of hat-shaped metal fitting 11, thereby regulating a position of connection substrate 7 having its terminal 7a electrically connected to connector 31a of mother substrate 31 in the Y axis direction. As shown in FIG. 25, dummy panel 52 covers, in its fixed state to the shield case 32, a part of notch 43 of shield case 34.

Thus, dummy panel 52 functions to cover end 34b of shield case 34 to hide it from the outside when optional unit 2 is not mounted, and functions to regulate the positions of connection substrate 7 electrically connected to mother substrate 31 in the Z axis direction and the Y axis direction.

Figure 26:
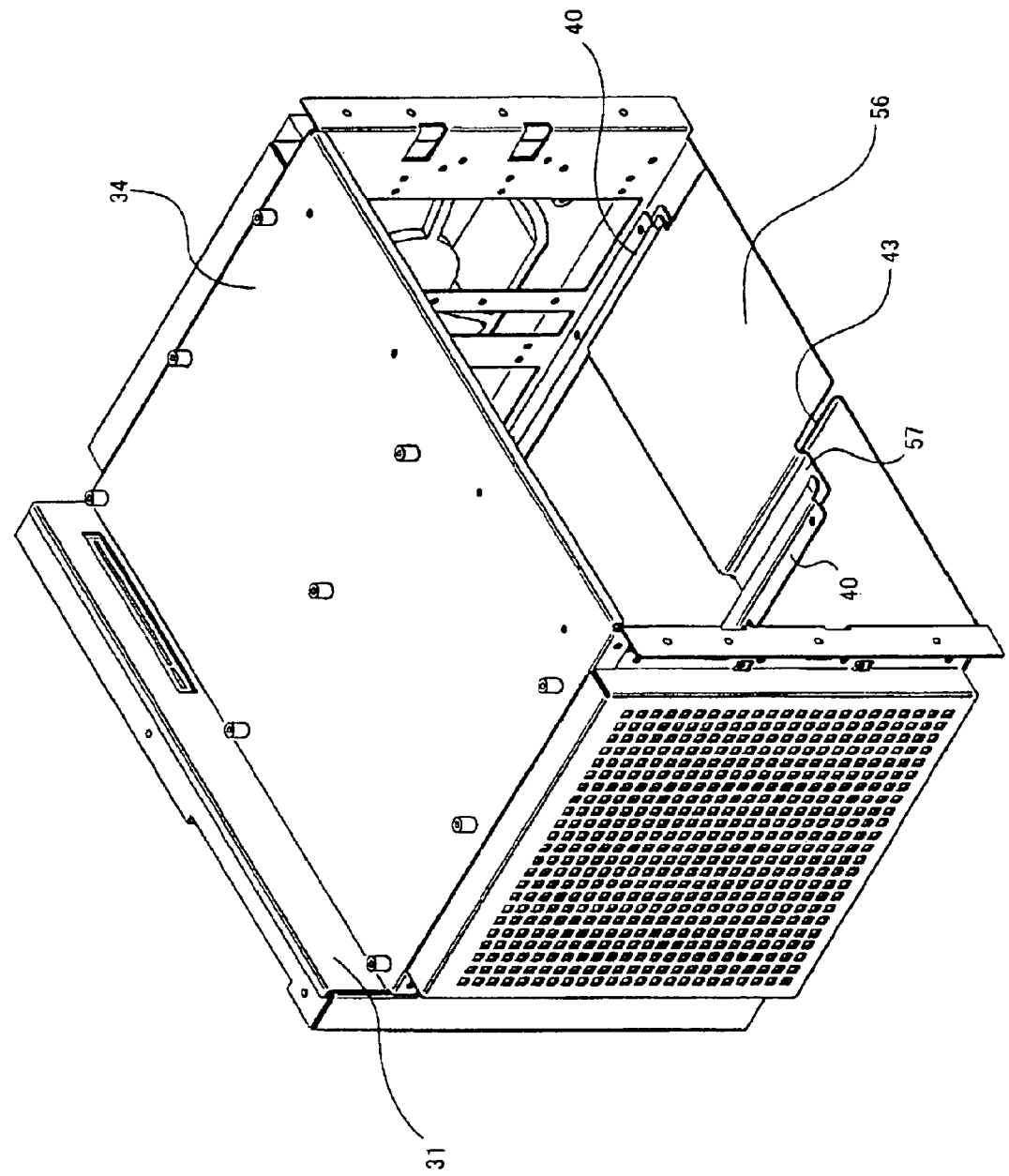
FIG. 26 A perspective view showing a state of covering the notch of the shield case with a shield plate.
Figure 27:
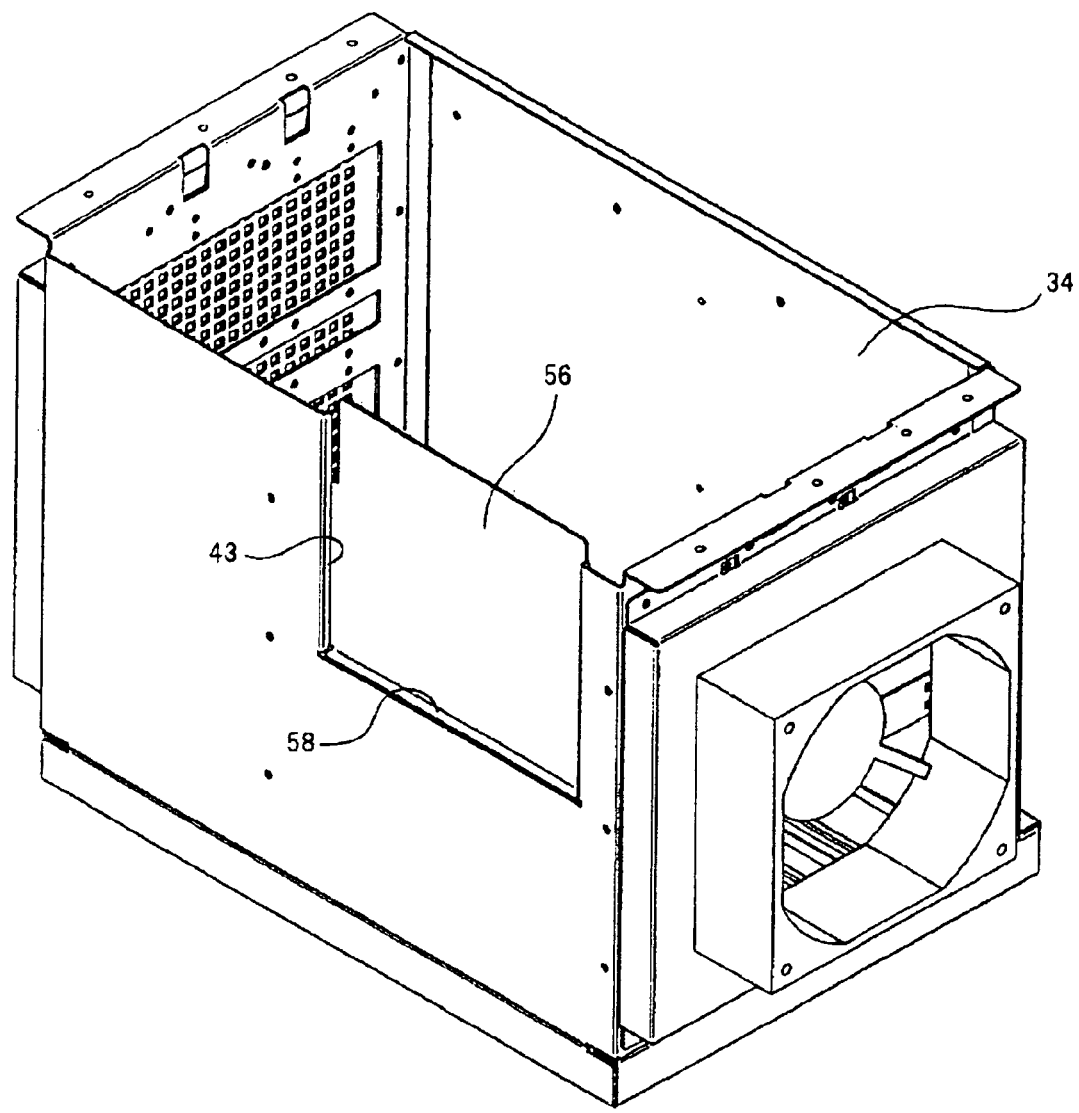
FIG. 27 A perspective view showing the state of covering the notch of the shield case with the shield plate.

As shown in FIGS. 26 and 27, projector 1 according to the embodiment includes shield plate 56 that serves as an electromagnetic shield member for covering notch 43 of shield case 34 in an unmounted state of optional unit 2 on mounting unit 4. Shield plate 56 is made of an electromagnetic shield member, and includes support piece 57 guided to Z-shaped guide metal fitting 40 of shield case 34 and abutted on the end of notch 43.

Figure 28:
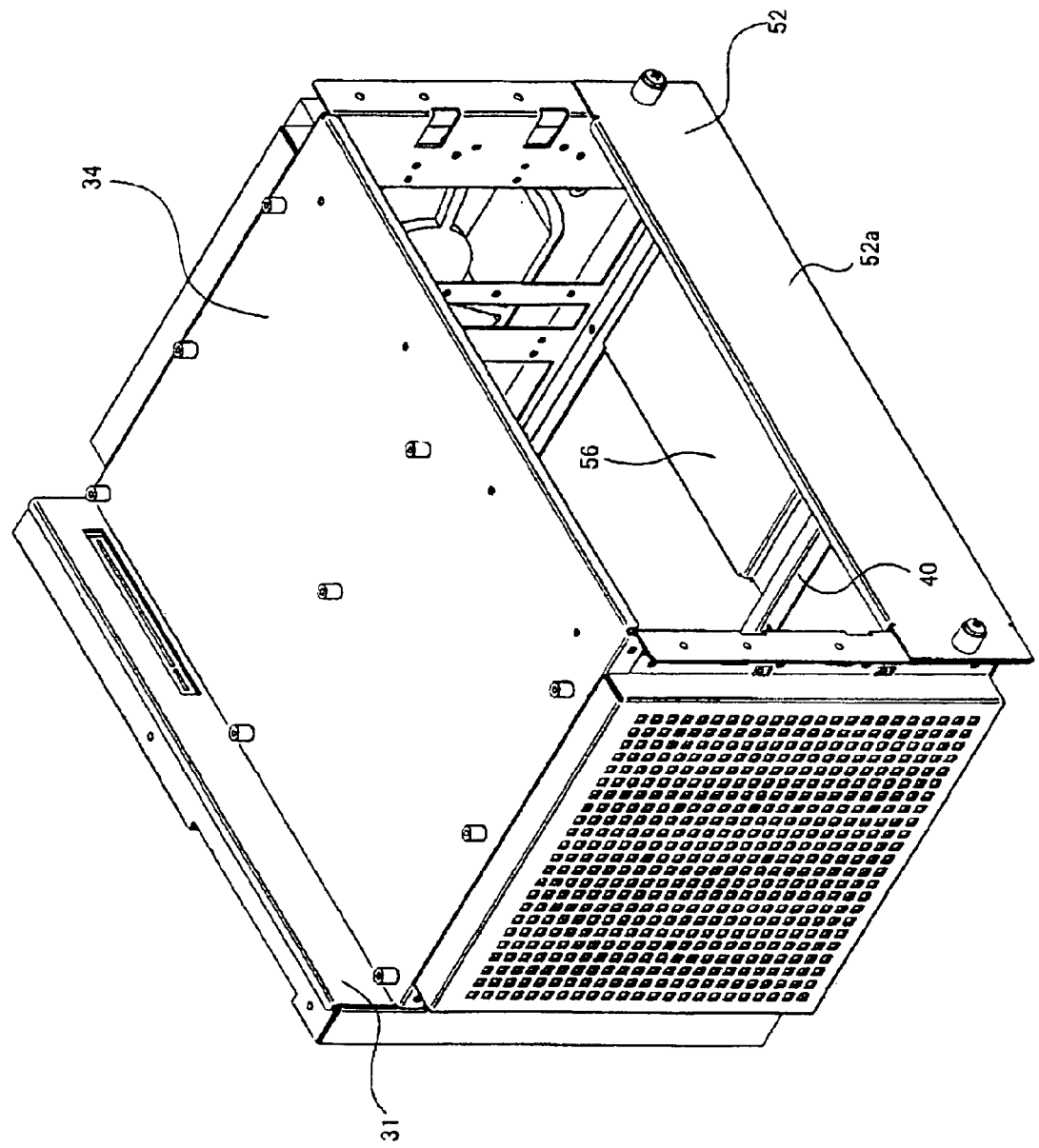
FIG. 28 A perspective view showing a state in which the shield plate and the dummy panel are fixed to the notch of the shield case.
Figure 29:
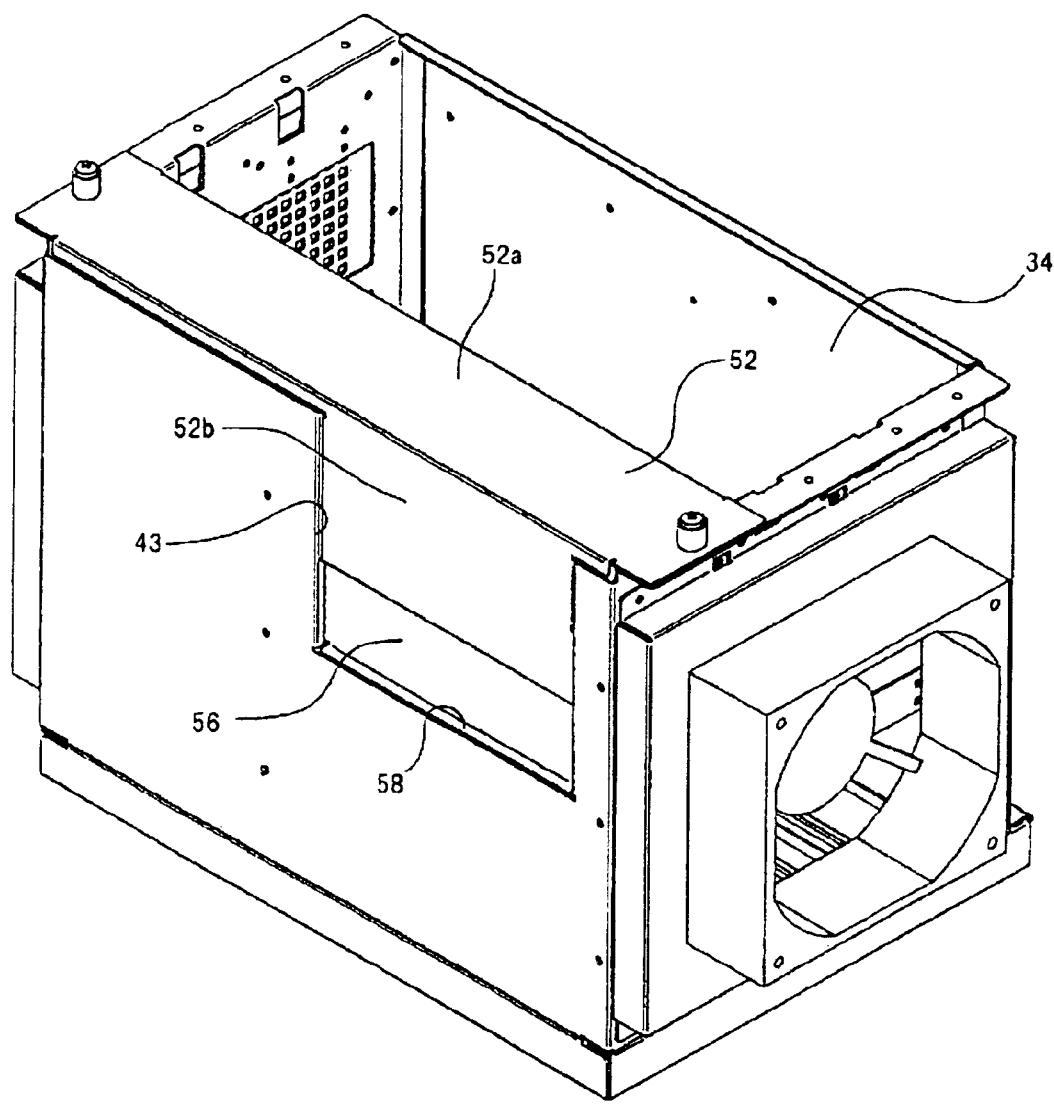
FIG. 29 A perspective view showing a state in which the shield plate and the dummy panel are fixed to the notch of the shield case.

Shield plate 56 fixed to notch 43 of shield case 34 is, as shown in FIG. 28, by abutting panel 52a of dummy panel 52 on the end of shield plate 56, fixed by abovementioned dummy panel 52. As shown in FIG. 29, in the fixed state of dummy panel 52 to shield case 34, cover 52b of dummy panel 52 is stacked on shield plate 56.

Figure 30:
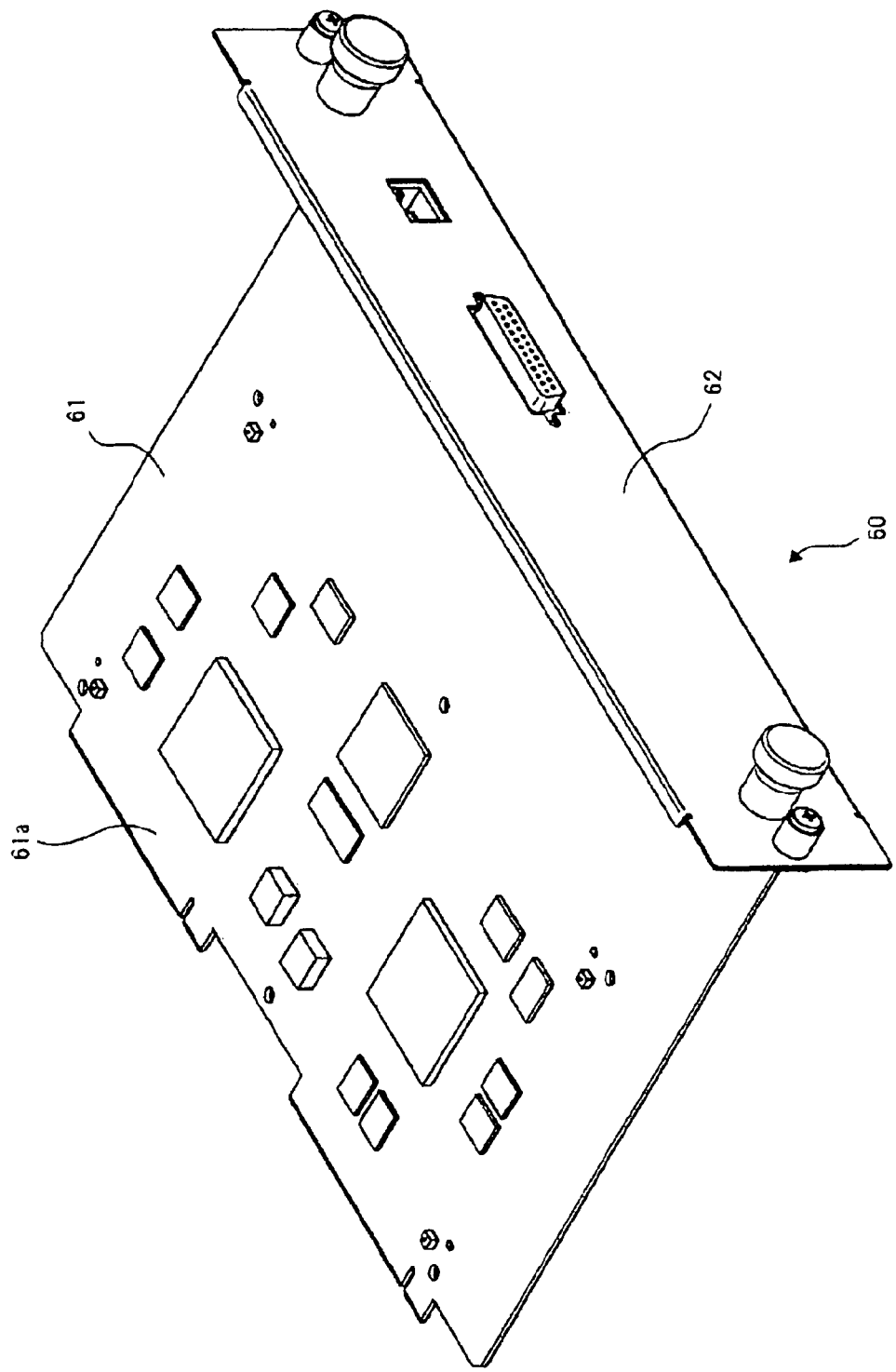
FIG. 30 A perspective view showing an optional board.
Figure 31:
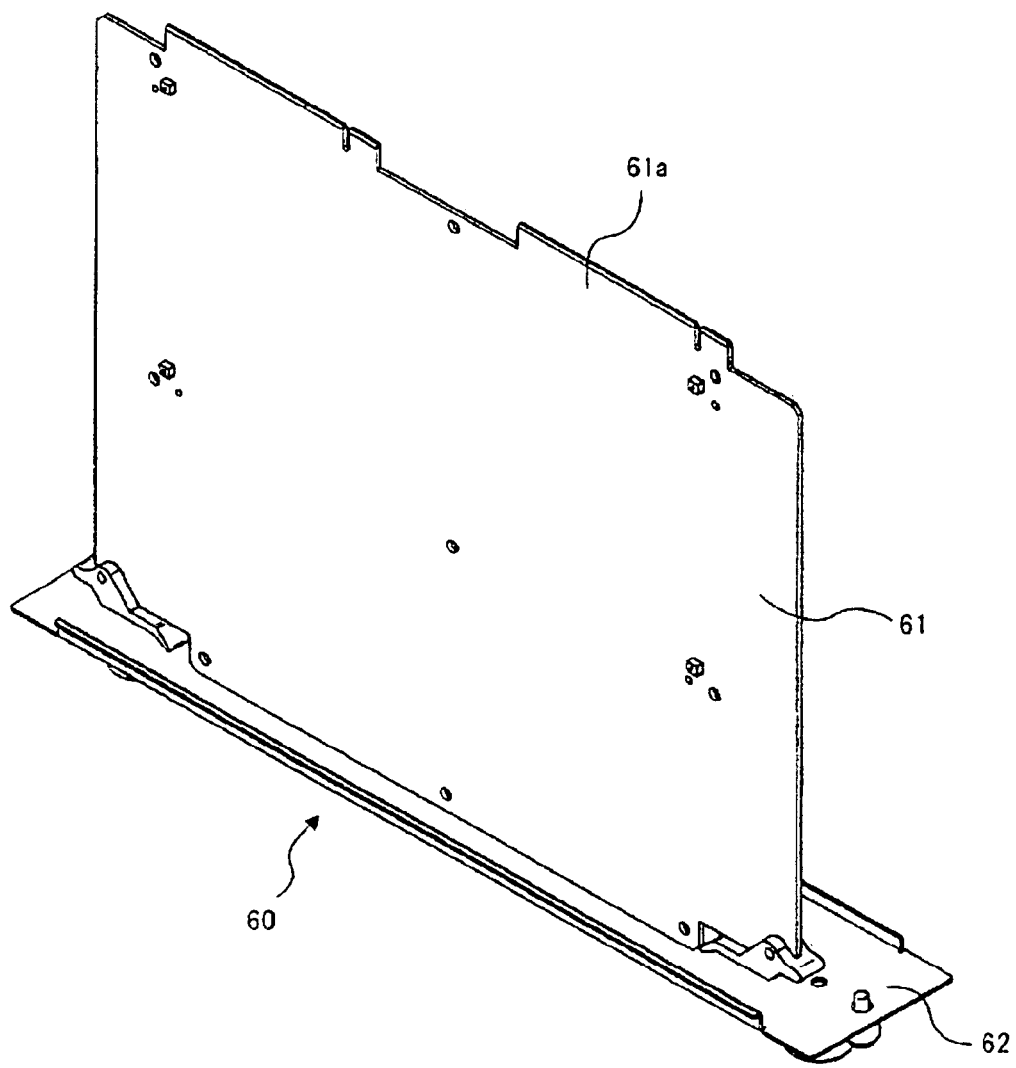
FIG. 31 A perspective view showing the optional board from a backside of a circuit board.

Projector 1 according to the embodiment includes an optional board (extension board) that is a circuit board having extension functions and is selectively mountable on mounting unit 4. As shown in FIGS. 30 and 31, optional board 60 includes circuit board 61 on which an electronic element is mounted, and interface 62 electrically connected to an external device. Circuit board 61 has terminal 61a electrically connected to connector 31a of mother substrate 31.

Figure 32:
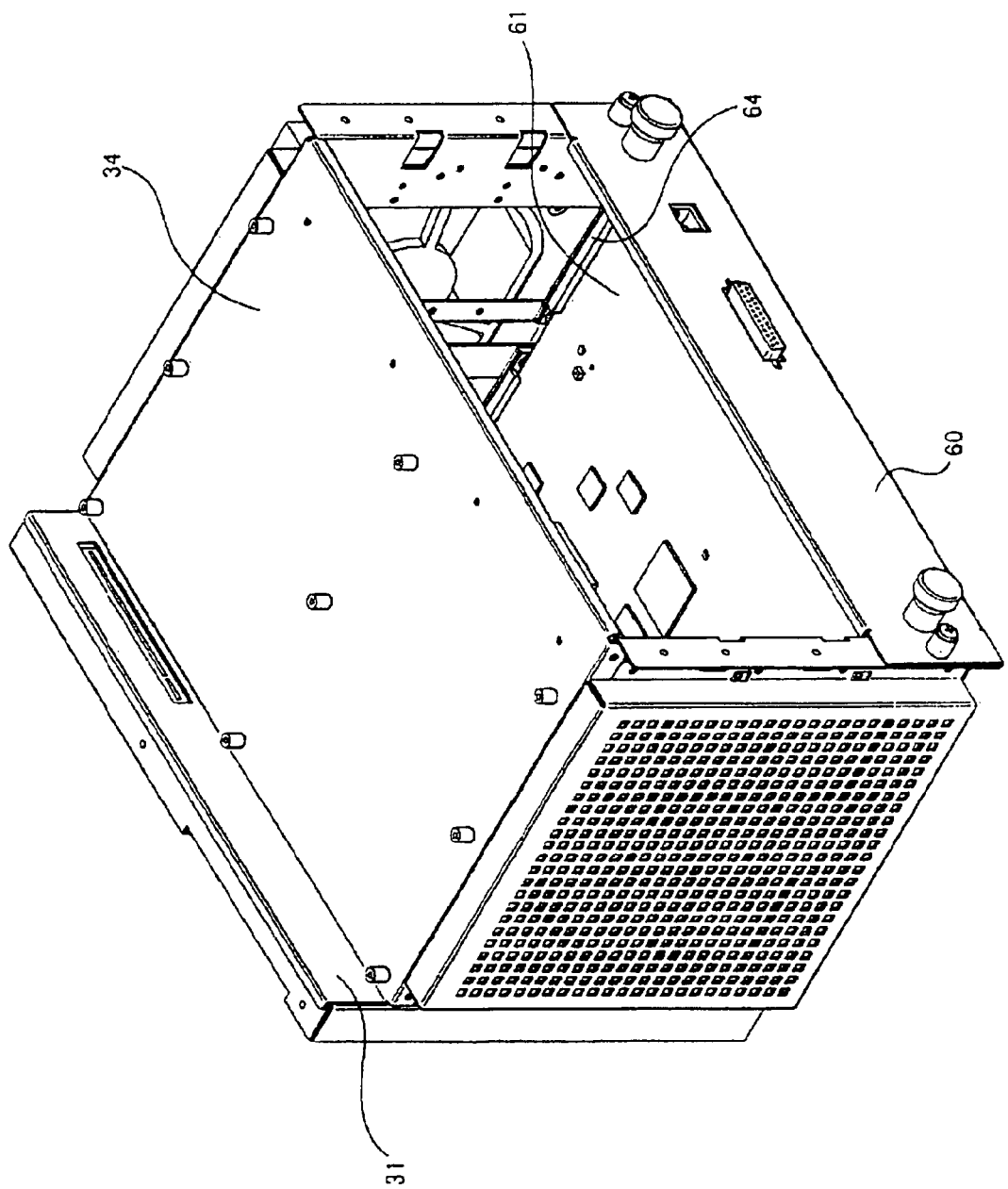
FIG. 32 A perspective view showing a mounted state of the optional board on the shield case.

In shield case 34, as shown in FIG. 32, guide member 64 is located, which has a groove for guiding an end of circuit board 61 of optional board 60. An optional board is guided by guide member 64 to slide, and terminal 61a of circuit board 61 is electrically connected to connector 31a of mother substrate 31.

Figure 33:
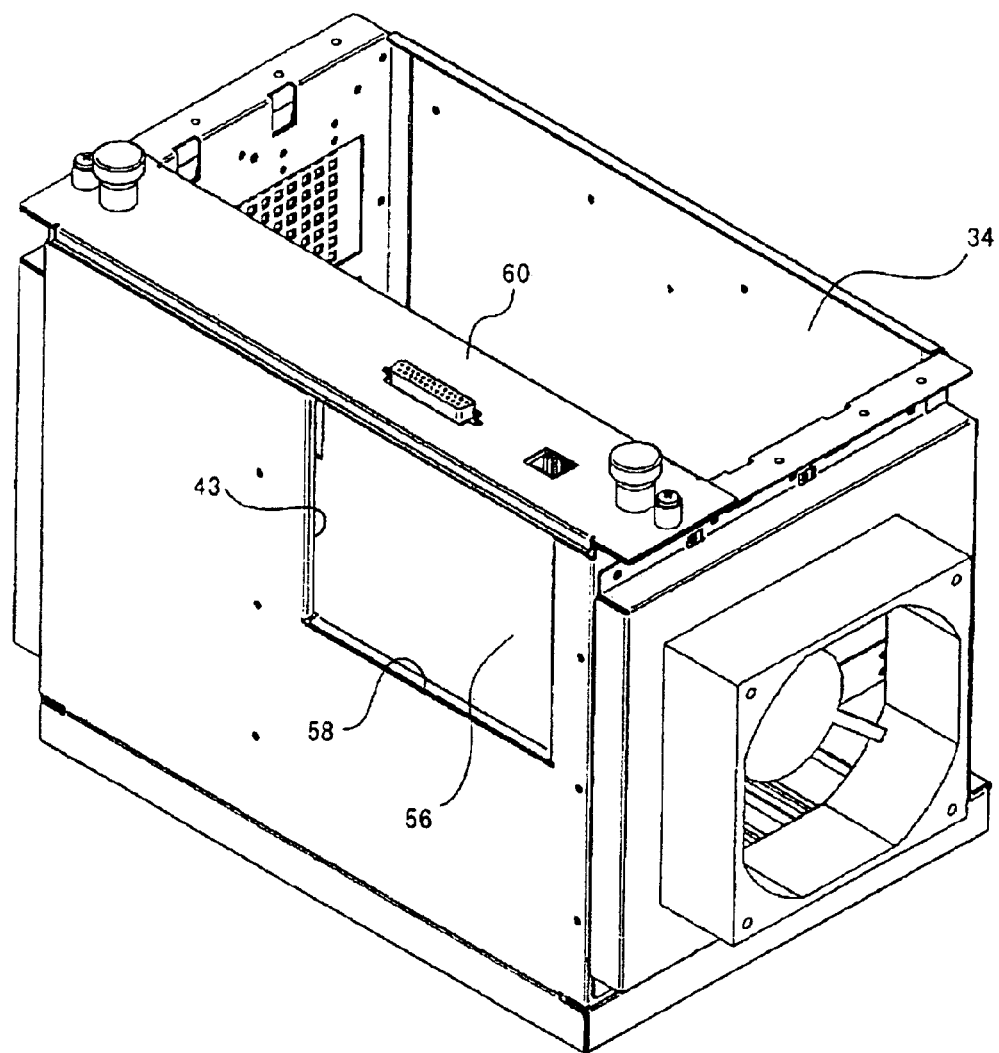
FIG. 33 A perspective view showing a covered state of the notch of the shield case with the shield plate when the optional board is mounted on the shield case.

As shown in FIG. 33, optional board 60 can be fixed to shield case 34 in the covered state of notch 43 with shield plate 56. Thus, circuit board 61 located in shield case 34 can appropriately be shielded electromagnetically.

As described above, shield case 34 is configured so that connection substrate 7 of optional unit 2 and circuit board 61 of optional board 60 can both be fixed. Shield plate 56 can cover notch 43 both when optional unit 2 is not fixed to shield case 34 and when optional board 60 is fixed to shield case 34.

According to the embodiment, by removing only side panel 47 from projector 1 and sliding optional unit 2 along Z-shaped guide metal fitting 40 to mount it in case 35, optional unit 2 is electrically connected to mother substrate 31. In other words, electrical connection between optional unit 2 and projector 1 is completed only by sliding optional unit 2, enabling optional unit 2 to function. In other words, optional unit 2 can be used. As a result, according to the embodiment, work for connecting cable 6 of optional unit 2 to projector 1 or work for removing a plurality of panels such as front panel 48 and top panel 49 for connecting cable 6 from projector 1 is made unnecessary.

Therefore, according to projector 1 and optional unit 2, attachment of optional unit 2 can be simplified. According to projector 1 and optional unit 2, when optional unit 2 is mounted on mounting unit 4, destruction of cable 6 of optional unit 2 and erroneous mounting such as connection of cable 6 to an inappropriate substrate can be prevented.

Optional unit 2 includes support mechanism 8 for supporting connection substrate 7 to be movable in the two axes, namely, the X axis and the Y axis, orthogonal to the direction of inserting terminal 7a of connection substrate 7 into connector 31a. Thus, support piece 23 of hat-shaped metal fitting 11 can be smoothly positioned in the groove of Z-shaped guide metal fitting 40, and terminal 7a can be accurately positioned to be electrically connected to connector 31a.

Projector 1 according to the embodiment is configured such that optional unit 2 is mounted by removing side panel 47 from case 35. Needless to say, however, removal is not limited to side panel 47. For example, a configuration where optional unit 2 is mounted by removing one panel from among front panel 48 and top panel 49 can be employed.

The present invention has been described with reference to the embodiment. However, the invention is not limited to the embodiment. Various changes and modifications understandable to those skilled in the art can be made in the configuration and specifics of the invention within a scope of the invention.

The invention claimed is:

1. A projector comprising:
   a mounting unit for mounting a unit including an extension function section, a connection substrate in which a terminal is located, and a cable for electrically connecting the extension function section and the connection substrate;
   a substrate including a connector to which the terminal of the connection substrate is electrically connected;
   a guide member located on the mounting unit and configured to movably guide the terminal of the connection substrate to the connector of the substrate; and
   a case in which the substrate is located,
   wherein one side face of the case has an opening for inserting/removing the unit into/from the case, a side face member for covering the opening being removably located in the opening, and
   when the unit is inserted into the case from the opening, the connection substrate is guided by the guide member, and the unit functions when the terminal is electrically connected to the connector.

2. The projector according to claim 1, further comprising a holding member including the guide member and configured to hold the connection substrate having the terminal electrically connected to the connector.

3. The projector according to claim 2, wherein the holding member holds the substrate.

4. The projector according to claim 2,
   wherein the unit includes a support mechanism for supporting the connection substrate to be movable in two axis directions orthogonal to a direction of inserting the terminal of the connection substrate into the connector of the substrate, and
   the guide member guides the connection substrate via the support mechanism.

5. The projector according to claim 1, wherein the substrate is a mother substrate electrically connected to each of a plurality of sub-substrates located in the case.

6. The projector according to claim 4,
   wherein the support mechanism includes a substrate support member for supporting the connection substrate, a spindle for supporting the substrate support member to be movable in a thickness direction of the connection substrate, and a pressing member for pressing the substrate support member in the thickness direction, the substrate support member includes a shaft hole having an inner diameter larger than an outer diameter of the spindle, and the guide member guides the substrate support member to be movable to the substrate.

7. The projector according to claim 4, wherein the holding member includes electromagnetic shielding means.

8. The projector according to claim 7, wherein the holding member includes a notch into which the support mechanism is inserted when the connection substrate is guided by the guide member, and the notch includes a removable electromagnetic shielding member guided, in an unmounted state of the unit, by the guide member to cover the notch.

9. The projector according to claim 8, wherein in the holding member, a circuit board having an extension function is held in the covered state of the notch with the electromagnetic shielding member, and a terminal of the circuit board is electrically connected to the connector of the substrate.

10. The projector according to claim 8, further comprising a dummy panel guided by the guide member to cover an end of the holding member at which the notch is formed, wherein the dummy panel regulates, in the covered state of the end, a position of the connection substrate having the terminal electrically connected to the connector of the substrate.

11. A unit for a projector, which is mountable on a mounting unit of the projector that includes: a substrate having a connector; a guide member for movably guiding the unit to the connector; and a case in which the substrate is located, one side face of the case including an opening for inserting/removing the unit into/from the case, and a side face member for covering the opening being removably located in the opening, the unit comprising:

an extension function section;

a connection substrate in which a terminal is located to be electrically connected to the connector of the substrate; and a cable for electrically connecting the extension function section and the connection substrate, wherein when the unit is inserted into the case from the opening, the connection substrate is guided by the guide member, and the unit functions when the terminal is electrically connected to the connector.

12. The unit for a projector according to claim 11, further comprising a support mechanism for supporting the connection substrate to be movable in two axis directions orthogonal to a direction of inserting the terminal of the connection substrate into the connector of the substrate.

13. The unit for a projector according to claim 12, wherein the support mechanism includes a substrate support member for supporting the connection substrate, a spindle for supporting the substrate support member to be movable in a thickness direction of the connection substrate, and a pressing member for pressing the substrate support member in the thickness direction, the substrate support member includes a shaft hole having an inner diameter larger than an outer diameter of the spindle, and the substrate support member is guided by the guide member.

* * * * *